United States Patent [19]

Burgess et al.

[11] Patent Number: 5,815,554
[45] Date of Patent: Sep. 29, 1998

[54] METHOD AND SYSTEM FOR INDICATING OPERATOR AVAILABILITY

[76] Inventors: Ken L. Burgess, 707 Peterson St., Fort Collins, Colo. 80524; Michael J. Lanning, 225 River North Dr. NW., Atlanta, Ga. 30328

[21] Appl. No.: 805,450

[22] Filed: Feb. 25, 1997

Related U.S. Application Data

[63] Continuation of Ser. No. 449,392, May 24, 1995, abandoned.

[51] Int. Cl.⁶ .................................................. H04M 15/00
[52] U.S. Cl. ........................... 379/90.01; 368/4; 368/13; 368/71; 368/82; 379/93.01; 379/102.01
[58] Field of Search ................................. 379/67, 88, 89, 379/265, 266, 309, 93.01, 90.01, 102.01, 201, 202, 216, 192; 368/10, 13, 71, 73, 82, 84, 4

[56] References Cited

U.S. PATENT DOCUMENTS

| | | | |
|---|---|---|---|
| 3,803,578 | 4/1974 | LaVanway | 340/286.06 |
| 3,893,094 | 7/1975 | Thorson et al. | 340/529 |
| 4,119,810 | 10/1978 | Marin et al. | 368/13 |
| 4,162,610 | 7/1979 | Levine | 368/41 |
| 4,485,463 | 11/1984 | Kita | 368/82 |
| 4,548,510 | 10/1985 | Levine | 368/10 |
| 4,585,904 | 4/1986 | Mincone et al. | 379/119 |
| 4,626,836 | 12/1986 | Curtis et al. | 345/156 |
| 4,656,657 | 4/1987 | Hunsicker | 379/119 |
| 4,757,529 | 7/1988 | Glapa et al. | 379/266 |
| 4,769,796 | 9/1988 | Levine | 368/82 |
| 4,780,839 | 10/1988 | Hirayama | 368/82 |
| 4,783,800 | 11/1988 | Levine | 379/67 |
| 4,788,715 | 11/1988 | Lee | 379/84 |
| 4,847,890 | 7/1989 | Solomon et al. | 379/67 |
| 5,060,255 | 10/1991 | Brown | 379/67 |
| 5,062,103 | 10/1991 | Davidson et al. | 379/265 |
| 5,113,380 | 5/1992 | Levine | 379/96 |
| 5,185,780 | 2/1993 | Leggett | 379/266 |
| 5,185,782 | 2/1993 | Srinivasan | 379/266 |
| 5,241,584 | 8/1993 | Hardy et al. | 379/266 |
| 5,289,531 | 2/1994 | Levine | 379/104 |
| 5,309,174 | 5/1994 | Minkus | 345/204 |
| 5,311,583 | 5/1994 | Friedes et al. | 379/266 |
| 5,313,517 | 5/1994 | Inaguma | 379/209 |
| 5,327,486 | 7/1994 | Wolff et al. | 379/211 |
| 5,329,578 | 7/1994 | Brennan et al. | 379/67 |
| 5,361,295 | 11/1994 | Solomon et al. | 379/67 |
| 5,388,150 | 2/1995 | Schneyer et al. | 379/67 |
| 5,396,544 | 3/1995 | Gilbert et al. | 379/67 |
| 5,438,612 | 8/1995 | Norimatsu | 379/192 |
| 5,465,286 | 11/1995 | Clare et al. | 379/216 |
| 5,467,388 | 11/1995 | Redd, Jr. et al. | 379/67 |
| 5,483,587 | 1/1996 | Hogan et al. | 379/202 |
| 5,499,291 | 3/1996 | Kepley | 379/309 |
| 5,506,898 | 4/1996 | Costantini et al. | 379/266 |
| 5,511,112 | 4/1996 | Szlam | 379/265 |
| 5,524,147 | 6/1996 | Bean | 379/266 |
| 5,528,558 | 6/1996 | Mardhekar et al. | 368/13 |
| 5,539,813 | 7/1996 | Jonsson | 379/209 |

*Primary Examiner*—Ahmad F. Matar
*Assistant Examiner*—Scott Wolinsky
*Attorney, Agent, or Firm*—Santangelo Law Offices, P.C.

[57] ABSTRACT

A timing system which permits the operator of the timing system to indicate to others who wish to interact with the operator whether the operator is currently available. If the operator of the device is unavailable, the ting system indicates at what time the operator will be available. A first device on the operator's desk is used for setting the period of time that the operator will be unavailable. A second device is connected to the first device by a communications link and is situated in a location visible to the potential visitors who wish to visit the operator. The second device indicates to visitors whether or not the operator is available and facilitates efficiency in an office environment by not requiring them to travel all the way to the operator's work space. If the operator is unavailable, the second device can also display the time when the operator will be available. Remote programming permits the operator to change the time that is displayed on the second device if, for example, a meeting in a remote building lasts longer than expected.

47 Claims, 14 Drawing Sheets

METHOD AND SYSTEM FOR INDICATING OPERATOR AVAILABILITY

This is a continuation of application Ser. No. 08/449,392 filed on May 24, 1995, now abandoned.

BACKGROUND OF THE INVENTION

This invention relates in general to timing devices and systems for protecting an operator from interrupts. More specifically, the invention relates to a timing device or system that permits the operator to indicate to visitors whether the operator is available and, if not available, to indicate the time when the operator will be available.

BACKGROUND—DISCUSSION OF PRIOR ART

In today's corporate environment of workforce downsizing and increased workloads, individual productivity is of ever-increasing importance. In many workplaces, private offices have been replaced by alternative work space organizations. Often, people work within cubicles consisting of office furniture enclosed within partitions of varying heights. In other offices, a workgroup will have their desks clustered together in an open space without benefit of partitions. While such arrangements provide an open work environment and facilitate communications, they provide a minimum of protection from interrupts. Whereas a closed office door can be used to indicate that one does not want to be disturbed, there is no effective and convenient way to indicate that the occupant of a desk in a cubicle or in an open space does not want to be disturbed. Furthermore, those in fully enclosed offices are often encouraged not to close the door (an "open door policy") and thus have limited protection from interrupts.

Several studies have shown that workplace interrupts are a major cause of lost productivity. For example, in the field of software development, it may take a software developer 30 to 60 minutes to fully immerse herself in a particular software routine with sufficient comprehension to be able to effectively work with the routine. If the developer's concentration is interrupted, however briefly, by a visitor, the developer may find that she needs to start over to regain the previous in-depth level of comprehension. Frequent interrupts not only lead to a loss of productivity for the software developer but also lead to the introduction of defects in the software. Such defects can have a serious productivity and financial impact on the organization. This same problem occurs with any type of knowledge worker who needs to focus her attention for extensive periods in order to achieve the necessary level of comprehension.

A common trait of human nature is that people are reluctant to tell visitors that they are too busy at the moment to talk to them. This reluctance results in people allowing themselves to be distracted from their work, which leads to the loss of productivity. Even if the worker proposes to the visitor a later meeting time, this interaction in and of itself constitutes an undesirable and counter-productive interrupt. Moreover, the relationship of the visitor to the worker may exacerbate the situation. If the visitor is the worker's supervisor, the worker is under increased pressure to converse with the visitor. It is difficult for workers to refuse, however politely, to speak with their supervisor. The inevitable tension this creates causes many workers to feel that their supervisor does not respect their privacy.

People could use techniques such as placing a paper or cardboard sign at their desk or at the entrance to their cubicle indicating that they do not wish to be disturbed. Such signs might also indicate for what period of time the occupant wishes not to be disturbed. Putting such a sign in place, however, would be inconvenient, likely requiring that the occupant leave his chair to place the sign. Furthermore, if the sign indicates a period of time during which the occupant wishes not to be disturbed, updating the sign would be inconvenient if the privacy period needs to be lengthened or shortened. In fact, the act of updating the sign would cause the loss of concentration that the person is trying to avoid.

Techniques such as a posting a sign near one's desk would have the limitation that it would be impossible for someone who is not physically located near the person desiring privacy to be aware that the person is expressing a desire for privacy. Walking to another person's desk only to find that the person prefers not to be disturbed is a significant waste of time and impacts the productivity of the visitor.

Another disadvantage of using signs and other simple techniques is that it would be impossible to change the information on the sign from a remote location. For example, assume that the operator posts a sign prior to leaving for a meeting indicating when the meeting will be done. If the meeting lasts longer than expected, it would be impossible for the operator to change the time on the sign without physically returning to where the sign is posted.

If the worker has an enclosed office, closing the office door is sometimes used to communicate, in effect, "I'm busy, do not disturb". Closing a door or some other technique of physically blocking access is unsatisfactory because it does not tell visitors when they should return. Also, such techniques still require the inconvenience of leaving one's chair to implement the means of restricting access. Furthermore, the open door policy common in many companies today discourages the closing of doors. People who occupy closed offices are thus left without a satisfactory solution. Closing the door sends a message of being uncommunicative while leaving the door open leaves the person susceptible to frequent interrupts.

To avoid telephone interruptions, workers will sometimes forward their telephone to a voicemail system, if available. While this benefits the worker, it does little to benefit the caller. In fact, when the voicemail system answers the forwarded telephone, the caller may mistakenly assume that the reason the voicemail system answered the telephone is because the worker is currently on the telephone. The caller may repeatedly, and fruitlessly, make subsequent calls in an attempt to reach the worker between calls.

Furthermore, when the worker is on the telephone, the caller is automatically transferred to voicemail with no indication when the worker's call will be finished. Again, this may leave the caller in the position of making repeated calls in order to reach the worker between calls or before he departs from his desk. When the worker is away from his desk, a similar problem occurs. After some number of rings, the caller is automatically transferred to voicemail with no indication to the caller when the worker will return.

A conscientious worker could change his voicemail greeting to indicate when he will be available whenever he leaves his desk, plans to be on the telephone for a lengthy period of time, or forwards his phone to voicemail. While this would be beneficial to callers, it is so time consuming and tedious to do that it seldom is done. The net affect is that a significant amount of time is wasted attempting to make telephone contact.

In summary, the inconvenience and ineffectiveness of any currently possible methods of indicating when one is busy and when one will be available results in workers being continuously interrupted with the resultant negative impact on productivity. In addition, a significant amount of time is wasted by potential visitors attempting to make contact with people who are unavailable. Likewise, a significant amount of time is wasted by telephone callers attempting to make contact with people who are on the telephone, who have their telephones forwarded to voicemail, or who are away from their desks.

SUMMARY OF THE INVENTION

The present invention overcomes the disadvantages of other possible methods by permitting the operator of the invention to simply and conveniently indicate if she is busy as well as specify the time when she will be available. The invention also permits potential visitors who are not physically located near the operator to determine when she will be available. This determination can be made using either a computer network or a telephony system. The operator is also able to use the computer network or the telephony system to remotely program the availability information maintained by the invention.

A Control Unit is located on the operator's desk for programming the period of time during which the operator is busy. This period of time is known as the Busy Period. A separate unit, which is positioned in a location easily seen by visitors, indicates whether the operator is available and, if not available, when the operator will be available. This unit is known as the Availability Unit.

The Control Unit contains a number of keys used to set the operator's availability information such as the Busy Period. The Busy Period (for example, two hours) is displayed on a Control Unit Display in a standard clock format of "HH:MM", where HH represents hours and MM represents minutes. For a two hour Busy Period, the Busy Period is displayed as "2:00". Each minute thereafter, the Busy Period is decremented by one minute until, after two hours, the Control Unit Display shows "0:00".

Knowing the Busy Period is of lesser importance to visitors than knowing exactly what time the operator will be available. The time that the operator will be available is known as the Availability Time and is calculated by adding the Busy Period to the current time. For example, if the operator programs a Busy Period of two hours when the current time is 9:30, the Control Unit calculates an Availability Time of 11:30. After calculating the Availability Time, the Control Unit transmits the Availability Time to the Availability Unit for display on an Availability Time Display. The Availability Time Display shows the Availability Time in a standard clock format. When the current time reaches the specified Availability Time, the Availability Time Display is blanked (cleared of all information).

The Availability Unit also provides an indication of whether the operator is currently available. This is known as the operator's Availability Status and is communicated by an Availability Status Light. The Availability Status Light is on if the operator is available and is off if the operator is unavailable. The Availability Status Light is mounted on top of the Availability Unit so as to be visible from any direction. Even if the Availability Time Display is unreadable due to orientation or distance from the visitor, the Availability Status Light will clearly indicate whether the operator is currently available.

Phone cord is used as the communications link between the Control Unit and the Availability Unit. Phone cord is much smaller than standard computer cable and is much more conducive to routing in and around furniture, partitions, and the like.

The operator can use the invention in a variety of situations. For example, if the operator is away from her desk at lunch, she can set her Availability Time prior to departing to indicate when she will return. This will help visitors avoid making multiple trips to seek someone who is absent from her desk. Furthermore, if the operator is conducting a meeting at her desk, she can use the invention to indicate to visitors when the meeting will be done, thus avoiding disrupting the meeting to communicate with visitors. Likewise, the operator can use the invention when she is on the phone to indicate to visitors when the phone call will be concluded.

The invention may also be connected to a desktop computer. In this configuration, a program is executed on the desktop computer which provides the identical user interface as the Control Unit itself. The operator can program the Busy Period using either the keys on the Control Unit or the user interface on the desktop computer. Furthermore, if the operator's computer is connected to other computers over a computer network, potential visitors can determine if the operator is available without having to physically visit the operator's location. This determination is made by querying the operator's Availability Status over the computer network. If the operator is unavailable, the potential visitor can then query the operator's Availability Time over the computer network. Armed with the operator's Availability Status and Availability Time, the visitor can plan his visit accordingly.

In another configuration, the Availability Unit is connected directly to the desktop computer and the Control Unit is not used. This method is advantageous for the many computer users who prefer not to have another device on their desk. In this configuration, the operator programs the Busy Period using the user interface on the desktop computer. The desktop computer then calculates the operator's Availability Time and transmits it to the Availability Unit for display.

In another configuration, neither the Control Unit nor the Availability Unit are used. The invention is comprised of a program that executes on the desktop computer and operation of the invention is controlled entirely from the desktop computer's user interface. While there is no Availability Unit, potential visitors can nonetheless determine the operator's availability by querying the operator's Availability Status and Availability Time over the computer network.

Not only does the invention effectively deal with visitors, it is also capable of protecting workers from undesirable telephone interrupts. The invention may be interfaced to the telephony system in two ways. In the first implementation, a telephone may be connected directly to the Control Unit. When the operator receives a call while a Busy Period is in effect, the Control Unit automatically answers the telephone and generates a synthesized message such as: "The person you have called is not available, please call back at 11:30".

In the second implementation of a telephone interface, the invention may be integrated with a voicemail system. This assumes that the invention is connected to a networked desktop computer and that the voicemail system is also connected to the computer network. When the operator receives a call, the voicemail system interrogates the operator's Availability Status and Availability Time over the computer network. If the operator is busy, the voicemail system intercepts the call and provides an audio message conveying when the operator will be available. This capability does not require that the telephone be connected to the Control Unit. Furthermore, the voicemail intercept capability can be provided regardless of whether the operator is on the phone, off the phone, or has the phone forwarded to the voicemail system.

Regardless of the manner in which the invention is interfaced to the telephony system, the telephone intercept capability avoids two less desirable outcomes when the operator is busy: (1) the operator answers the call and is thereby interrupted or (2) the operator does not answer the phone but is nonetheless interrupted by the ongoing ringing until either the caller hangs up or an answering system intercepts the call. The automated voice response also benefits callers by informing them when the operator will be available so that they can plan subsequent calls accordingly.

The connection of the invention to a networked desktop computer provides an additional benefit: remote programming. If the operator is away from his desk but has access to another networked computer, he can remotely log into his desktop computer and program his Availability Status and Availability Time. If the invention is integrated with a telephony system and a voicemail system, the operator can likewise program the invention using a telephone. If, for example, the operator is going to be late for work, he can call into the voicemail system and use his telephone to remotely program his Availability Time to communicate to his co-workers when he expects to arrive at work.

By making the operator's availability information visible near the operator's desk, accessible over the computer network, and accessible through the telephony system, an environment is created where the worker can safeguard some amount of uninterrupted time. The fact that potential visitors can determine in a number of ways when the operator is busy increases the likelihood that the operator will not be disturbed at inopportune times.

Benefits also accrue to the visitor who is informed, in a clear and unambiguous manner, whether visitation is welcome. This avoids the uncomfortable situation of visiting someone only to realize that the visit is unwelcome at this particular time. Visitors can safely assume that visitation is welcome any time the Availability Status Light is on. If the operator is unavailable, potential visitors can schedule their return visit based on the operator's Availability Time.

Thus, the benefits of using this invention accrue both to the operator and to potential visitors and therefore reinforce use of the invention by both parties. Usability by both parties is further enhanced by the fact that the Control Unit can be conveniently located on the operator's desk while the Availability Unit can be positioned separately for easy viewing by visitors.

In summary, the invention makes it possible for workers to secure an uninterrupted block of private time in a work environment which otherwise affords minimal privacy. The invention effectively addresses the issue of how to diplomatically tell visitors to "leave me alone for awhile". This delicate message is communicated in a polite, professional, and inoffensive manner that is likely to be accepted by both peers and supervisors alike. By discouraging interrupts, the ability of the worker to maintain focus and concentration is enhanced, thereby increasing the worker's productivity.

DETAILED DESCRIPTION OF THE PREFERRED EMBODIMENT

Figures 1A, 1B:
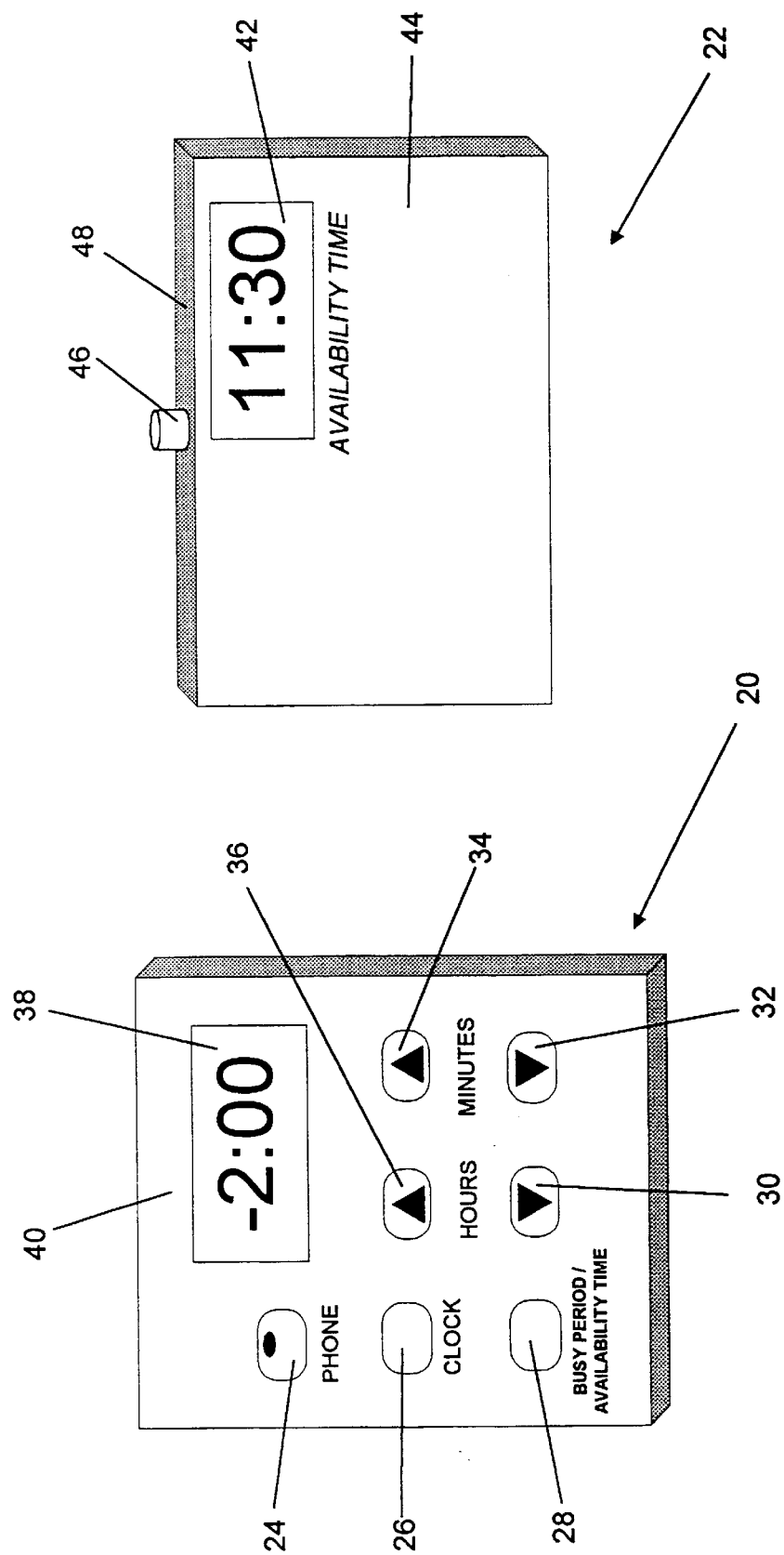
FIG. 1A is a view showing the Control Unit of the invention.
FIG. 1B is a view showing the Availability Unit of the invention.

Referring now to the drawings, a preferred embodiment of the interrupt control system is shown in FIG. 1A at 20 and in FIG. 1B at 22. A Control Unit 20 shown in FIG. 1A is used by the operator to program the Busy Period and is a controller of the invention. An Availability Unit 22 shown in FIG. 1B is viewed by visitors to determine the operator's availability and comprises an availability status indicator and an availability time indicator of the invention.

While the functions of Control Unit 20 and Availability Unit 22 could be combined into one enclosure, keeping them physically separate and distinct as shown in FIG. 1A and FIG. 1B has the advantage of permitting Control Unit 20 to be optimally positioned for the operator while Availability Unit 22 can be optimally positioned for the visitor.

Control Unit 20 in FIG. 1A contains a group of seven keys 24, 26, 28, 30, 32, 34 and 36 and a Control Unit Display 38 on a front panel 40. Control Unit Display 38 is composed of four numerical displays arranged in a clock format, "HH:MM", where HH represents hours and MM represents minutes. For display of certain information, the left most hours numerical display is used to display a minus sign.

Availability Unit 22 in FIG. 1B contains an Availability Time Display 42 on a front panel 44. Availability Time Display 42 is composed of four numerical displays arranged in a clock format, "HH:MM", where HH represents hours and MM represents minutes. Availability Time Display 42 comprises an availability time indicator of the invention. Availability Unit 22 also contains an Availability Status Light 46 on a top panel 48. Availability Status Light 46 is green in color and is on when the operator is available and is off when the operator is unavailable. Availability Status Light 46 comprises an availability status indicator of the invention.

Figure 2B:
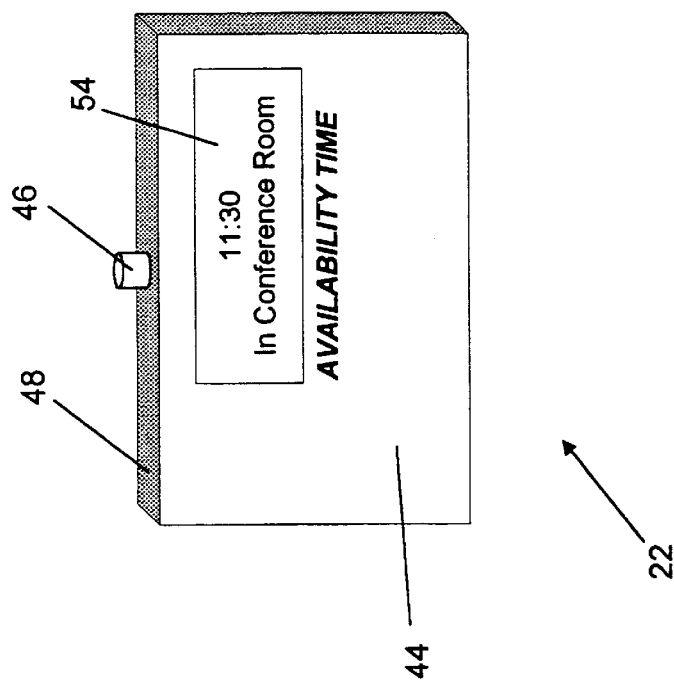
FIG. 2B is a front view of the Availability Unit shown in FIG. 1B with expanded display capabilities.
Figure 2A:
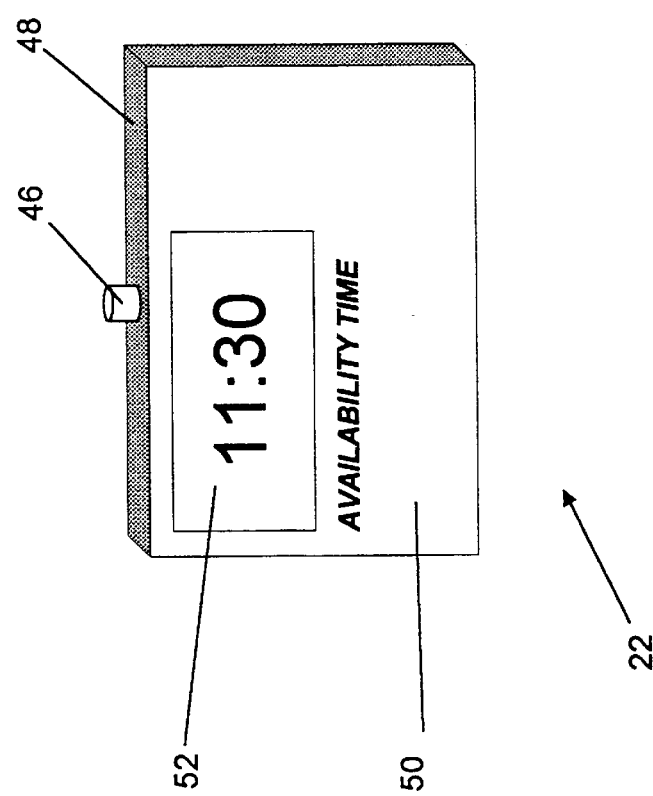
FIG. 2A is a rear view of the Availability Unit shown in FIG. 1B.

Referring additionally to FIG. 2A, a rear panel 50 of Availability Unit 22 is depicted. An additional Availability Time Display 52 is provided of the same size and nature as Availability Time Display 42. Availability Time Display 52 displays the operator's Availability Time and thus also comprises an availability time indicator of the invention. Availability Time Display 42 on front panel 44 and Availability Time Display 52 on rear panel 50 permit viewing of the operator's Availability Time from most viewing angles.

Additional display capability can be provided as shown in Availability Unit 22 in FIG. 2B. An Alpha-Numeric Display 54 on front panel 44 contains alpha-numeric characters to provide additional availability information, such as indicating where the operator is when she is away from her desk. Alpha-Numeric Display 54 permits display of the standard ASCII (American Standard Code for Information Interchange) character set as well as character sets such as Greek, Hebrew, Arabic, Russian, Japanese, and Chinese.

Figures 3A, 3B:
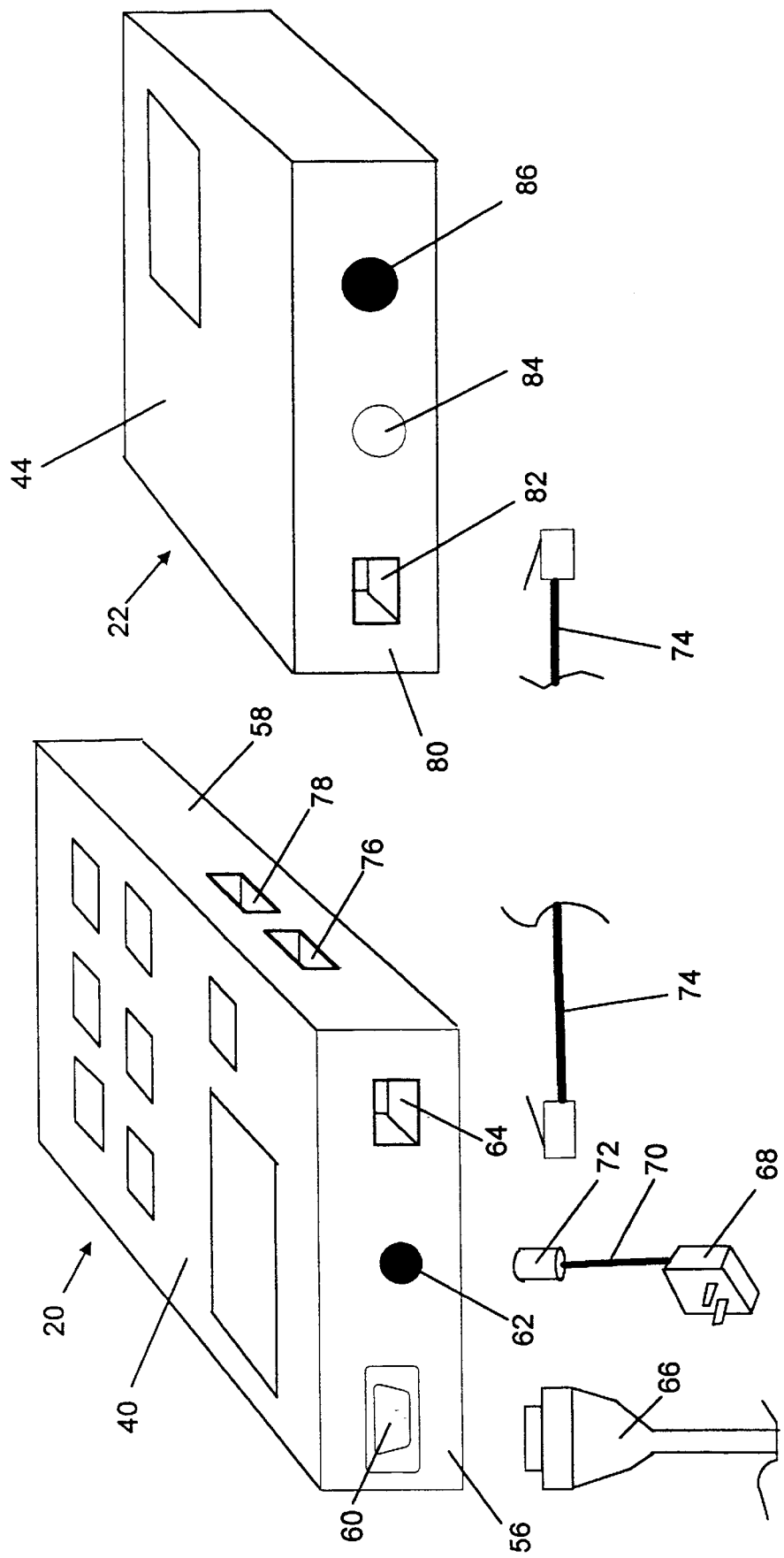
FIG. 3A is a top and a side view of the Control Unit shown in FIG 1A.
FIG. 3B is a bottom view of the Availability Unit shown in FIG 1B.

Referring now to FIG. 3A, a top perspective view of Control Unit 20 shows a top panel 56 and a side panel 58. Top panel 56 contains a 9-pin connector 60, an Alternating Current (AC) power connector 62, and a 6-wire phone connector 64. A cable assembly 66 may be connected to 9-pin connector 60 to interface Control Unit 20 to a desktop computer. Control Unit 20 is powered by a wall transformer 68 which provides operating power through a power cord 70 and a power plug 72. Power plug 72 is inserted into AC power connector 62. Control Unit 20 interfaces to Availability Unit 22 through 6-wire phone connector 64 and a 6-wire phone cord 74. Side panel 58 contains two 4-wire phone connectors, a telephone line connector 76 which connects to the telephone line and a telephone set connector 78 which connects to the telephone set.

Referring now to FIG. 3B, a bottom panel 80 of Availability Unit 22 is shown. Bottom panel 80 contains a 6-wire phone connector 82, a 0.25 inch threaded insert 84, and an auxiliary power connector 86. Availability Unit 22 interfaces to Control Unit 20 through 6-wire phone connector 82 and 6-wire phone cord 74. Power to Availability Unit 22 is supplied either through 6-wire phone cord 74 or through auxiliary power connector 86.

Threaded insert 84 is suitable for attachment of Availability Unit 22 to a standard camera mounting system. Because of the many different types of camera mounting systems that are available, there are many ways that Availability Unit 22 can be mounted, including on a tripod, on top of a partition, on the edge of a table, on top of a bookcase, and the like. One such solution is the Bogen 3008 table top tripod.

Figure 4A:
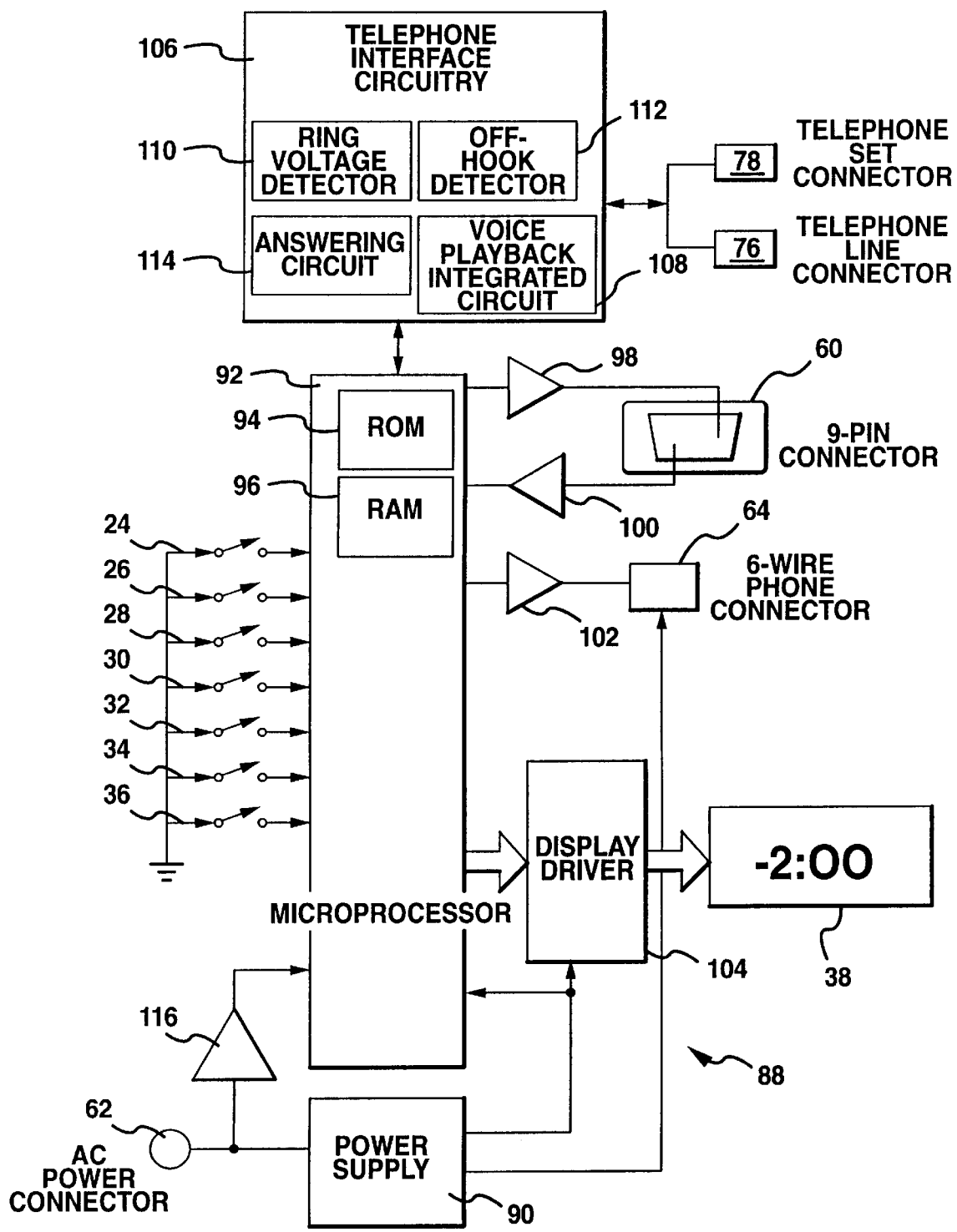
FIG. 4A is a detailed block diagram of the Control Unit of the invention.

Referring now to FIG. 4A, an electrical block diagram of the circuitry of Control Unit 20 is shown at 88. The circuitry shown in electrical block diagram 88 receives operating power from AC power connector 62. A power supply 90 generates a plurality of voltages used by the circuitry of electrical block diagram 88. Power supply 90 also generates the power supply voltage for Availability Unit 22, which is provided through 6-wire phone connector 64.

A microprocessor 92 controls all functions of Control Unit 20. Microprocessor 92 contains a ROM (Read Only Memory) 94 which is programmed at the factory to contain the necessary program sequences. Microprocessor 92 also contains a RAM (Random Access Memory) 96 in which all dynamic information required for operation of Control Unit 20 is stored. Microprocessor 92 is a standard off-the-shelf microprocessor that may be purchased from various manufacturers such as Microchip Technology, Inc. which markets a PIC16C57 microprocessor containing 2,048 words of ROM and 72 bytes of RAM.

Interface circuitry is provided to permit microprocessor 92 to interface to a desktop computer, to Availability Unit 22, to Control Unit Display 38, and to a telephone set. Interfacing to Control Unit Display 38 is provided by a display driver 104 which receives its input from microprocessor 92. Control Unit Display 38 contains four Light Emitting Diode (LED) numerical displays with a colon between the second and third digits. These displays may be purchased off-the-shelf from various manufacturers such as Lite-On, Inc. which markets an LTS-4640AE 0.4 inch orange LED numerical display.

Interfacing to a desktop computer is provided by an RS-232 transmitter 98 and an RS-232 receiver 100. RS-232 transmitter 98 receives a logic signal from microprocessor 92 and provides a data signal to 9-pin connector 60. RS-232 receiver 100 receives a data signal from 9-pin connector 60 and provides a logic signal to microprocessor 92. Although other interface techniques may be used to interface to the desktop computer, RS-232 is the preferred interface due to its simplicity and low cost.

Interfacing to Availability Unit 22 is provided by an RS-232 transmitter 102 and 6-wire phone connector 64. RS-232 transmitter 102 receives a logic signal from microprocessor 92 and provides a data signal to 6-wire phone connector 64.

Interfacing to a telephone set is provided by telephone interface circuitry 106, telephone line connector 76, and telephone set connector 78. Telephone interface circuitry 106 contains a voice playback integrated circuit 108, a ring voltage detector 110, an off-hook detector 112, and an answering circuit 114. Voice playback integrated circuit 108 may be purchased off-the-shelf from various manufacturers such as Information Storage Devices, Inc. which markets the ISD1000A voice playback integrated circuit.

Microprocessor 92 uses ring voltage detector 110 to monitor ringing of the telephone set. Depending on operating state stored in RAM 96, microprocessor 92 may use answering circuit 114 to answer the telephone set and may use voice playback integrated circuit 108 to generate a message to the caller. Microprocessor 92 detects if the operator picks up the telephone handset through off-hook detector 112.

Microprocessor 92 calculates time based on the 60 cycles/second frequency of the AC power supplied through AC power connector 62 and an AC power buffer 116. ROM 94 contains a program sequence which counts 60 cycles of the AC power signal to determine when one second has elapsed. Further counting means within microprocessor 92 are used to calculate minutes and hours which are stored in RAM 96.

Microprocessor 92 sequentially inputs and tests keys 24, 26, 28, 30, 32, 34 and 36 to determine when the operator has asserted a key. Depending on which key is asserted and what state Control Unit 20 is in, microprocessor 92 may undertake a number of actions, such as calculating a new Busy Period. Furthermore, in response to assertion of a key, microprocessor 92 may initiate an RS-232 data transmission through 9-pin connector 60 or through 6-wire phone connector 64.

Figure 4B:
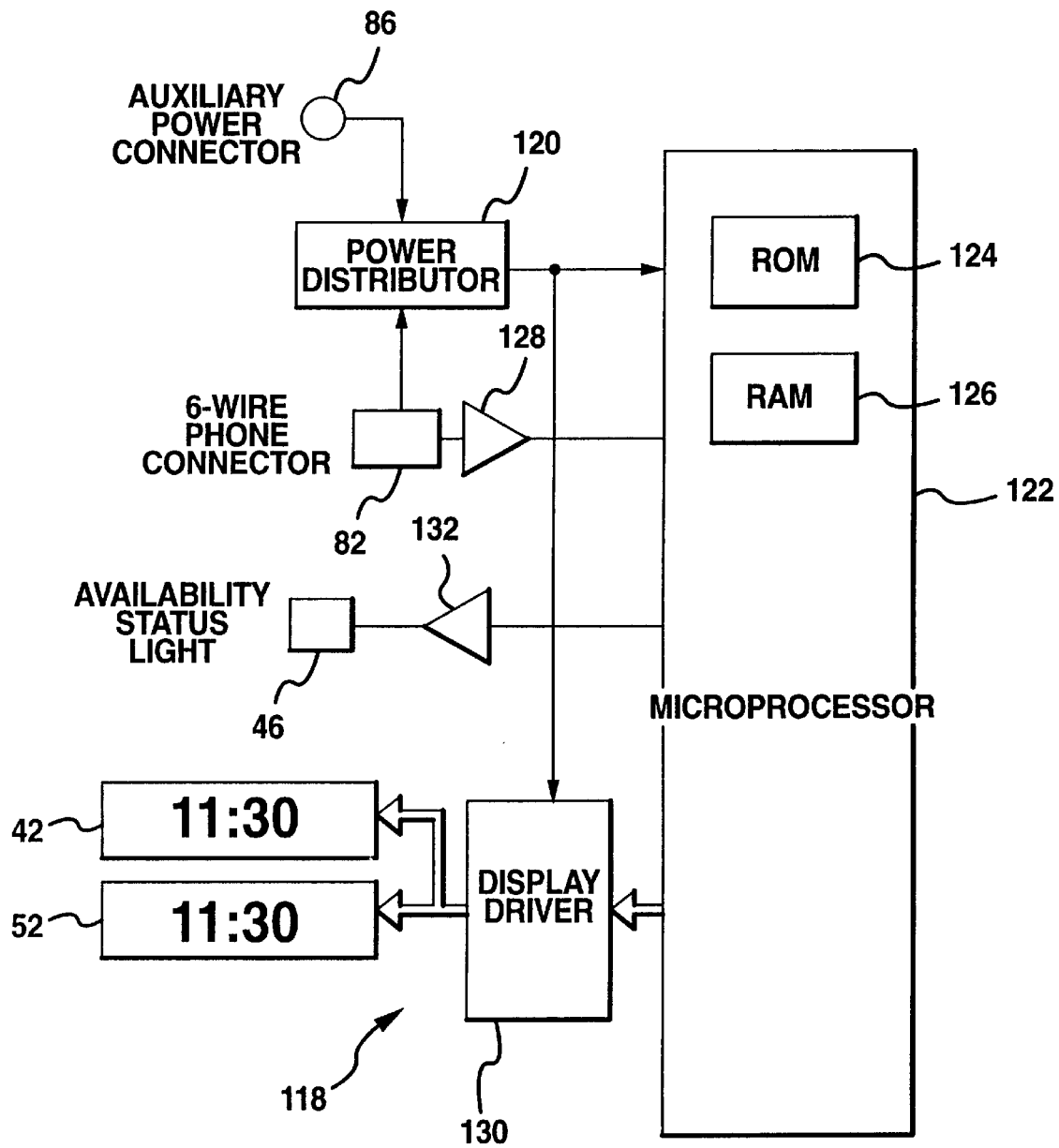
FIG. 4B is a detailed block diagram of the Availability Unit of the invention.

Referring now to FIG. 4B, an electrical block diagram of the circuitry of Availability Unit 22 is shown at 118. The circuitry of electrical block diagram 118 receives operating power from 6-wire phone connector 82 or from auxiliary power connector 86. A power supply 120 generates a plurality of voltages used by the circuitry of electrical block diagram 118. A microprocessor 122 controls all functions of Availability Unit 22. Microprocessor 122 contains a ROM 124 which is programmed at the factory to contain the necessary program sequences. Microprocessor 122 also contains a RAM 126 in which all dynamic information required for operation of Availability Unit 22 is stored. Microprocessor 122 is a standard off-the-shelf microprocessor that may be purchased from various manufacturers such as Microchip Technology, Inc. which markets a PIC16C54 microprocessor containing 512 words of ROM and 32 bytes of RAM.

An RS-232 receiver 128 receives a data signal from 6-wire phone connector 82 and provides a logic signal to microprocessor 122. Microprocessor 122 monitors the logic signal to decode the contents of the RS-232 data signal.

Microprocessor 122 drives Availability Status Light 46 using a light driver 132. Availability Status Light 46 comprises an availability status indicator of the invention.

Microprocessor 122 drives Availability Time Displays 42 and 52 using a display driver 130. Availability Time Displays 42 and 52 each contain four LED numerical displays with a colon between the second and third digits. These displays may be purchased off-the-shelf from various manufacturers such as Lite-On, Inc. which markets an LTS-3401LR 0.8 inch orange LED numerical display. Availability Time Displays 42 and 52 comprise an availability time indicator of the invention. Microprocessor 122 can blank Availability Time Displays 42 and 52 using display driver 130 by eliminating the drive current to the numerical displays. In the blanked state, all LED segments of the numerical displays are off.

Availability Unit 22 can be designed to support Alpha-Numeric Display 54 as shown in FIG. 2B. Alpha-Numeric Display 54 is composed of dot matrix LED alpha-numeric characters. These alpha-numeric characters may be purchased off-the-shelf from various manufacturers such as Lite-On, Inc. which markets an ITP-254FFM-01 16×16 dot matrix LED alpha-numeric character.

Figure 5:
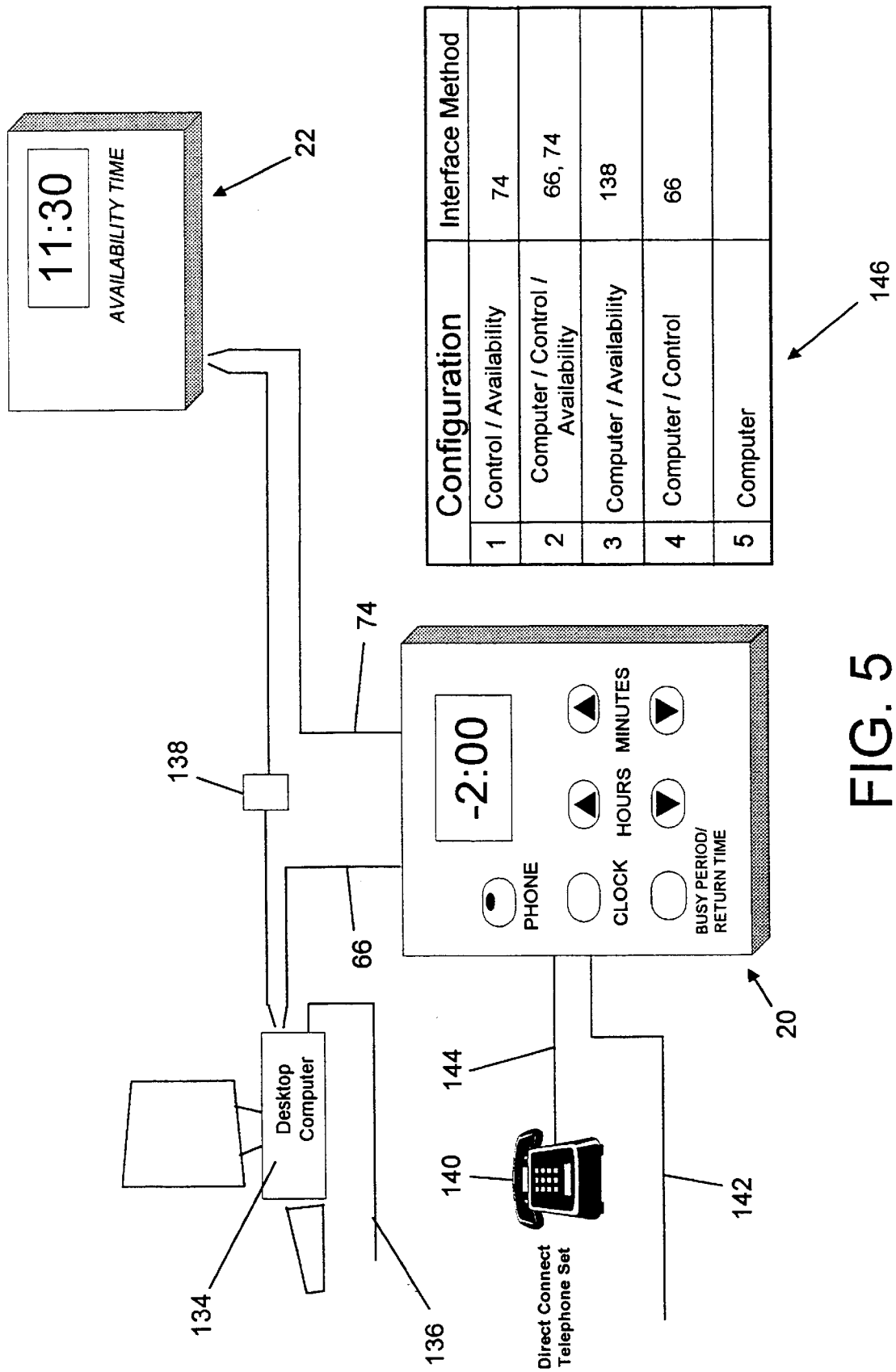
FIG. 5 shows the various configurations supported by the invention.

Referring now to FIG. 5, five different configurations of the invention are presented. The different configurations are based on various combinations of Control Unit 20, Availability Unit 22, and a desktop computer 134. Desktop computer 134 may be any suitable computer that provides an RS-232 serial interface, such as an IBM-compatible Personal Computer or a UNIX workstation. Desktop computer 134 may be used as a controller of the invention in the same manner that Control Unit 20 may be used as a controller of the invention. Desktop computer 134 incorporates a network connection 136 to permit desktop computer 134 to exchange information with other computers. In those configurations which include desktop computer 134 with network connection 136, potential visitors may access the operator's Availability Status and Availability Time from their own computers.

A variety of interface methods are used to interface between the devices of FIG. 5. Six-wire phone cord 74 connects Control Unit 20 to Availability Unit 22. Cable assembly 66 connects Control Unit 20 to desktop computer 134. A translation cable 138 connects Availability Unit 22 directly to desktop computer 134. A signal translation is required to interface between the RS-232 connector on desktop computer 134 and 6-wire phone connector 82 on Availability Unit 22. Of the two interface cables shown in proximity to desktop computer 134, only one cable may be connected at any one time. Likewise, of the two interface cables shown in proximity to Availability Unit 22, only one cable may be connected at any one time.

A direct connect telephone set 140 may be interfaced to any configuration that includes Control Unit 20. A 4-wire telephone set cord 144 connects direct connect telephone set 140 to Control Unit 20. A 4-wire telephone line cord 142 connects Control Unit 20 to the telephony system.

A Configuration Table 146 in FIG. 5 shows the five configurations supported by the invention and the interface methods between the different devices. Configuration 1 of Configuration Table 146 consists of Control Unit 20 and Availability Unit 22 interfaced with 6-wire phone cord 74. Configuration 2 consists of Control Unit 20 interfaced to desktop computer 134 with cable assembly 66 and to Availability Unit 22 with 6-wire phone cord 74. Configuration 3 consists of desktop computer 134 connected directly to Availability Unit 22 through translation cable 138. Configuration 4 consists of desktop computer 134 connected to Control Unit 20 through cable assembly 66. Configuration 5 consists of desktop computer 134 operating with neither Control Unit 20 nor Availability Unit 22.

In Configurations 1 and 2 of Configuration Table 146 in FIG. 5, Availability Unit 22 receives its operating power from Control Unit 20 through 6-wire phone cord 74. This eliminates the need to have a separate power cord to Availability Unit 22. Because Availability Unit 22 is, by its nature, intended to be mounted in a visible location, having only one cord connected to the unit avoids the cluttered appearance that both a phone cord and a power cord would produce. Furthermore, while it is a simple matter to obtain phone cords of many different lengths, extending a power cord is problematic. However, because Configuration 3 does not include Control Unit 20, Availability Unit 22 is powered separately by wall transformer 68, power cord 70, and power plug 72. Power plug 72 is connected to auxiliary power connector 86.

Figure 6:
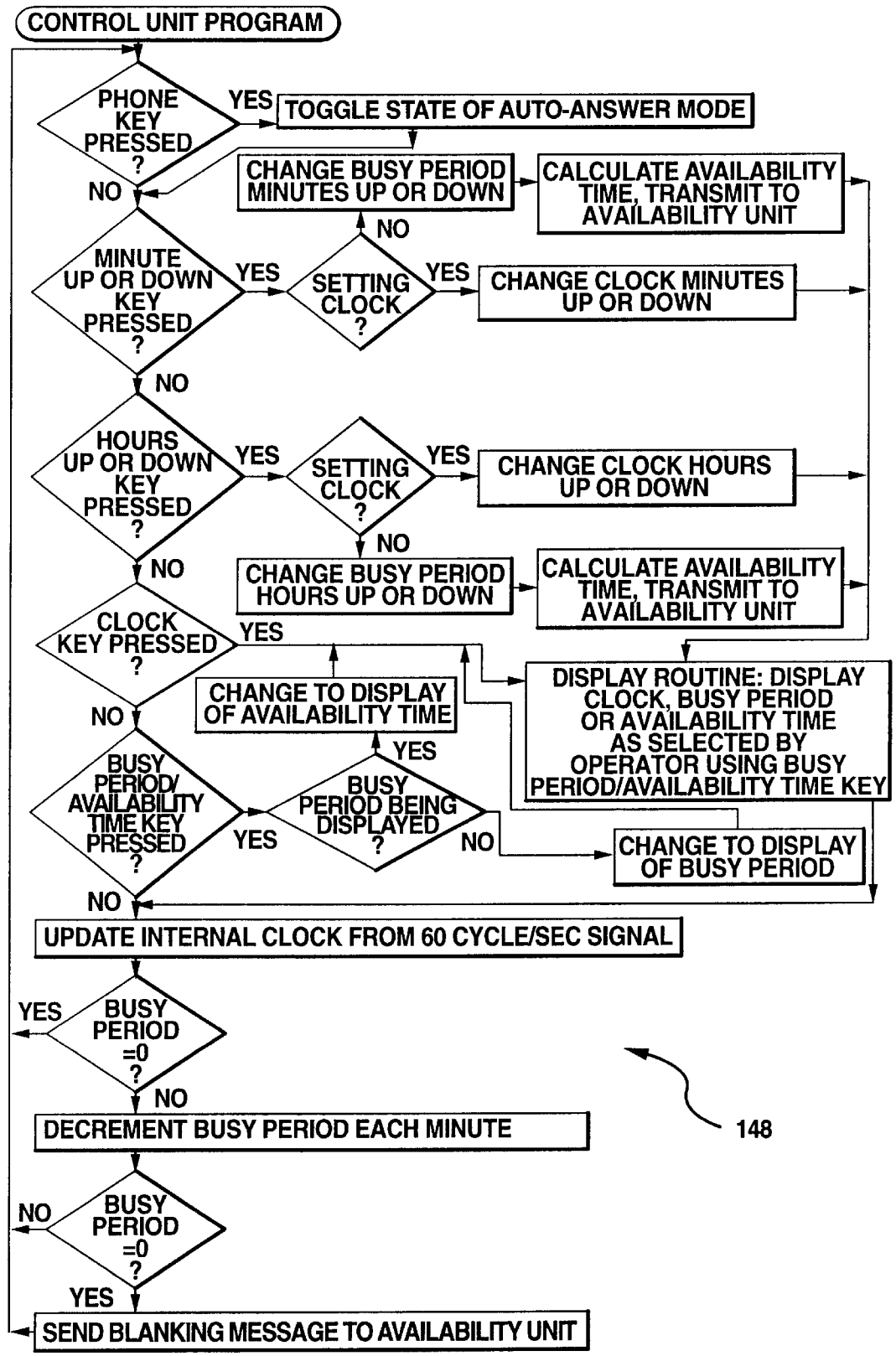
FIG. 6 is a flowchart depicting the program sequences of the Control Unit.

Operation of Configuration 1 is now discussed in detail. Configurations 2 through 5, all of which include desktop computer 134, operate in a similar manner. In Configuration 1, Control Unit 20 is the controller of the invention. FIG. 6 shows a Control Unit Program 148 stored in ROM 94 in microprocessor 92 which controls operation of Control Unit 20.

When power is initially applied to Control Unit 20 and Availability Unit 22, Availability Time Displays 42 and 52 are blank and Availability Status Light 46 is on, indicating that the operator is available. The operator's first action is to set the internal clock maintained within Control Unit 20. To do this, the operator presses a Clock Key 26 which results in the current time being shown on Control Unit Display 38. While the time is being displayed, the colon between the hours digits and the minutes digits flashes. While continuing to press Clock Key 26, the operator uses a Minutes Up Key 34 and a Minutes Down Key 32 to set the minutes for the clock. Similarly, the operator uses an Hours Up Key 36 and an Hours Down Key 30 to set the hours for the clock. While the preferred embodiment of the invention is based on a 12 hour clock, AM and PM indicators could be used to implement a 24 hour clock. When setting of the clock is complete, the operator releases Clock Key 26.

After setting the clock, the operator can program his availability information, such as his Busy Period or Availability Time. To do this, the operator taps any key other than Clock Key 26 which causes Control Unit Display 38 to show the Busy Period. A Busy Period of "0:00" is initially displayed, indicating that the Busy Period has yet to be programmed. To program the Busy Period, Minutes and Hours Up/Down Keys 30–36 are used. Hours Up Key 36 and Hours Down Key 30 change the Busy Period in 60 minute intervals while Minutes Up Key 34 and Minutes Down Key 32 change the Busy Period in one minute intervals. The preferred embodiment of the invention supports a Busy Period of 9 hours, 59 minutes, large enough for the majority of usages.

Whenever the Busy Period is displayed on Control Unit 20, the left most digit on Control Unit Display 38 is set to a "–" (minus sign). For example, a Busy Period of 3 hours is displayed as "–3:00". A minus sign is used to denote display of the Busy Period because the Busy Period decrements over time. After the Busy Period is programmed, the Busy Period displayed on Control Unit Display 38 decrements minute-by-minute until "0:00" is displayed after 3 hours.

Whenever the Busy Period is programmed, Control Unit 20 adds the Busy Period to the current time to calculate the operator's Availability Time. Control Unit 20 then transmits the Availability Time to Availability Unit 22 over 6-wire phone cord 74. When the Busy Period expires (reaches 0:00), Control Unit 20 transmits a blanking command to Availability Unit 22 over 6-wire phone cord 74.

Figure 7:
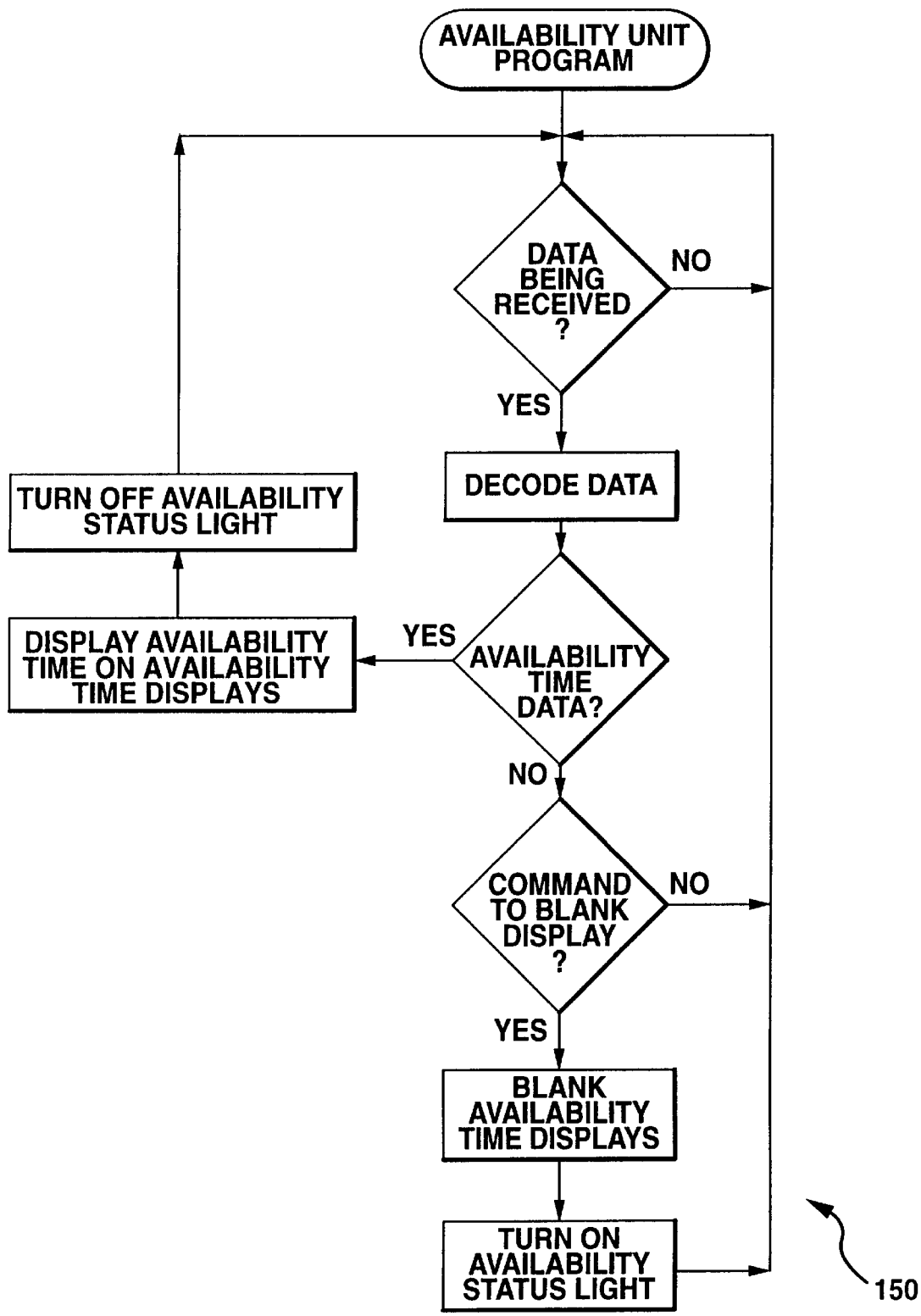
FIG. 7 is a flowchart depicting the program sequences of the Availability Unit.

Operation of Availability Unit 22 is controlled by an Availability Unit Program 150 of FIG. 7. Availability Unit Program 150 is stored in ROM 124 within microprocessor 122. Availability Unit Program 150 monitors the output of RS-232 receiver 128 to detect when data is received. When data is received, Availability Unit Program 150 decodes the data. If the data is Availability Time data, the Availability Time is displayed on Availability Time Displays 42 and 52 and Availability Status Light 46 is turned off. If the data is a blanking command, Availability Time Displays 42 and 52 are blanked and Availability Status Light 46 is turned on.

While the Busy Period decrements each minute, the Availability Time displayed on Availability Time Displays 42 and 52 remains unchanged until the Busy Period expires. If a Busy Period of 3 hours is programmed when the current time is 1:30, an Availability Time of 4:30 is calculated and transmitted to Availability Unit 22 for display on Availability Time Displays 42 and 52. The Availability Time remains displayed until the Busy Period expires at which time Control Unit 20 sends a blanking command to Availability Unit 22 to blank Availability Time Displays 42 and 52. At the same time, Availability Status Light 46 is turned on to indicate that the operator is available.

Just as Availability Status Light 46 comprises an availability status indicator, it should be noted that Availability Time Displays 42 and 52 also comprise an availability status indicator. Availability Time Displays 42 and 52 are in one of two states, blank or non-blank. When blank, Availability Time Displays 42 and 52 indicate that the operator is available in the same manner as an illuminated Availability Status Light 46. When Availability Time Displays 42 and 52 are displaying an Availability Time, this indicates that the operator is not available in the same manner as an extinguished Availability Status Light 46. The advantage of Availability Status Light 46 as an availability status indicator compared to Availability Time Displays 42 and 52 is that Availability Status Light 46 is visible from any angle and from longer distances.

Whenever the Busy Period is changed by the operator, Control Unit 20 calculates a new Availability Time and transmits it to Availability Unit 22 over 6-wire phone cord 74. For example, if the current time is 1:30 and the operator increases the Busy Period from three hours to three hours and 30 minutes, Control Unit 20 adds this new Busy Period to the current time of 1:30 to calculate a new Availability Time of 5:00. Control Unit 20 then transmits the new Availability Time to Availability Unit 22. Availability Unit 22 decodes this transmission and displays an Availability Time of "5:00". In general, it is a simple and unobtrusive matter to assert either Minutes Up Key 34 (likely multiple times) or Hours Up Key 36 to increase the Busy Period to obtain any desired incremental protected time.

At any point in time, the operator can also decrease the Busy Period by using Hours Down Key 30 or Minutes Down Key 32, including resetting the Busy Period to 0:00 by successive assertion of these keys. If the Busy Period is reset to 0:00, Control Unit 20 transmits a blanking command to Availability Unit 22 to blank Availability Time Displays 42 and 52 and to turn on Availability Status Light 46.

The operator can use a Busy Period/Availability Time Key 28 to change the information displayed on Control Unit Display 38 from the Busy Period to the Availability Time. This capability is provided based on a survey of users. In planning the completion of a task, some people prefer to think about how much time they will need to complete the task, for example, 30 minutes. In this case, they would use Busy Period/Availability Time Key 28 to select display of the Busy Period on Control Unit Display 38. Other people prefer to think about what time they will be done with a particular task, for example, at 11:00. In this case, they would use Busy Period/Availability Time Key 28 to select display of the Availability Time on Control Unit Display 38. Thus, the ability to view information in either format is provided. Each assertion of Busy Period/Availability Time Key 28 toggles the information shown on Control Unit Display 38 between the Busy Period and the Availability Time.

When the Availability Time is displayed on Control Unit Display 38, the left most digit is either blank (for times of 9:59 or less) or is a one (for times of 10:00 or greater). This distinguishes display of the Availability Time from display of the Busy Period which, again, is denoted by a minus sign in the left most digit of Control Unit Display 38. When the Availability Time is displayed on Control Unit Display 38, Minutes and Hours Up/Down Keys 30, 32, 34 and 36 can be used to increase or decrease the Availability Time. In this case, Control Unit Display 38 and Availability Time Displays 42 and 52 all display the identical information, namely the operator's Availability Time.

When the Busy Period expires, operation of Control Unit Display 38 depends on what information is currently displayed. If the Availability Time is displayed on Control Unit Display 38 when the Busy Period expires, the display alternates twice per second between displaying the Availability Time (for example, "5:00") and "--:--". This alerts the operator that the Busy Period has expired and that his protective period has likewise expired. Tapping any key terminates the flashing nature of Control Unit Display 38 and causes a static "--:--" to be displayed, indicating that no Availability Time is currently programmed.

If the Busy Period is displayed on Control Unit Display 38 when the Busy Period expires, the Busy Period of "0:00" is flashed on and off at a rate of twice per second. This alerts the operator that the Busy Period has expired and that his protective period has likewise expired. Tapping any key terminates the flashing nature of Control Unit Display 38 and causes a static "0:00" to be displayed.

The Operator can tap Clock Key 26 at any time to display the clock time on Control Unit Display 38 which, again, is denoted by flashing of the colon between the hours digits and the minutes digits. Furthermore, the operator can re-program the clock time by pressing Clock Key 26 and then using Minutes and Hours Up/Down Keys 30, 32, 34 and 36 to set the minutes and hours. When programming of the clock time is complete, the operator releases Clock Key 26. The clock time remains displayed on Control Unit Display 38 until any other key is asserted, at which time either the Busy Period or the Availability Time is displayed, depending on what information was displayed prior to viewing of the clock time.

A remote access of the availability status indicator or availability time indicator may also be used. Remote access allows the potential visitor to access the operator's availability status indicator or availability time indicator through a computer network or a telephony system. FIG. 5 shows one method of interfacing the invention to the telephony system. Control Unit 20 can be interfaced to direct connect telephone set 140 by 4-wire telephone set cord 144. Control Unit 20 can be interfaced to the telephony system by 4-wire telephone line cord 142.

Pressing a Phone Key 24 causes Control Unit 20 to enter Auto-Answer Mode, as indicated by illumination of the light embedded in Phone Key 24. If Control Unit 20 is in Auto-Answer Mode and if a Busy Period has been programmed, Control Unit 20 automatically answers incoming calls and uses voice playback integrated circuit 108 to generate a message such as: "The person you have called is not available, please call back at 11:30". Thus, when the invention is interfaced to direct connect telephone set 140 and when Auto-Answer Mode is enabled, the invention provides a remote access of the availability status indicator and a remote access of the availability time indicator. Successive assertions of Phone Key 24 toggle operation in and out of Auto-Answer Mode.

Connection of Control Unit 20 to the telephony system supports other capabilities. For example, when Control Unit 20 detects an off-hook condition, a Busy Period can be automatically activated such as a 10 minute Busy Period. The corresponding Availability Time can then be calculated and displayed on Availability Unit 22. If the Busy Period expires but the telephone is still off hook, Control Unit 20 can extend the Busy Period by another 10 minutes.

Configurations 2 through 5 as shown in Configuration Table 146 of FIG. 5 are now discussed. Configuration 2 consists of Control Unit 20 interfaced to both desktop computer 134 and to Availability Unit 22. Control Unit 20 interfaces to desktop computer 134 using cable assembly 66 and interfaces to Availability Unit 22 using 6-wire phone cord 74. This configuration is hereafter referred to as the Computer/Control/Availability Configuration.

Figure 8:
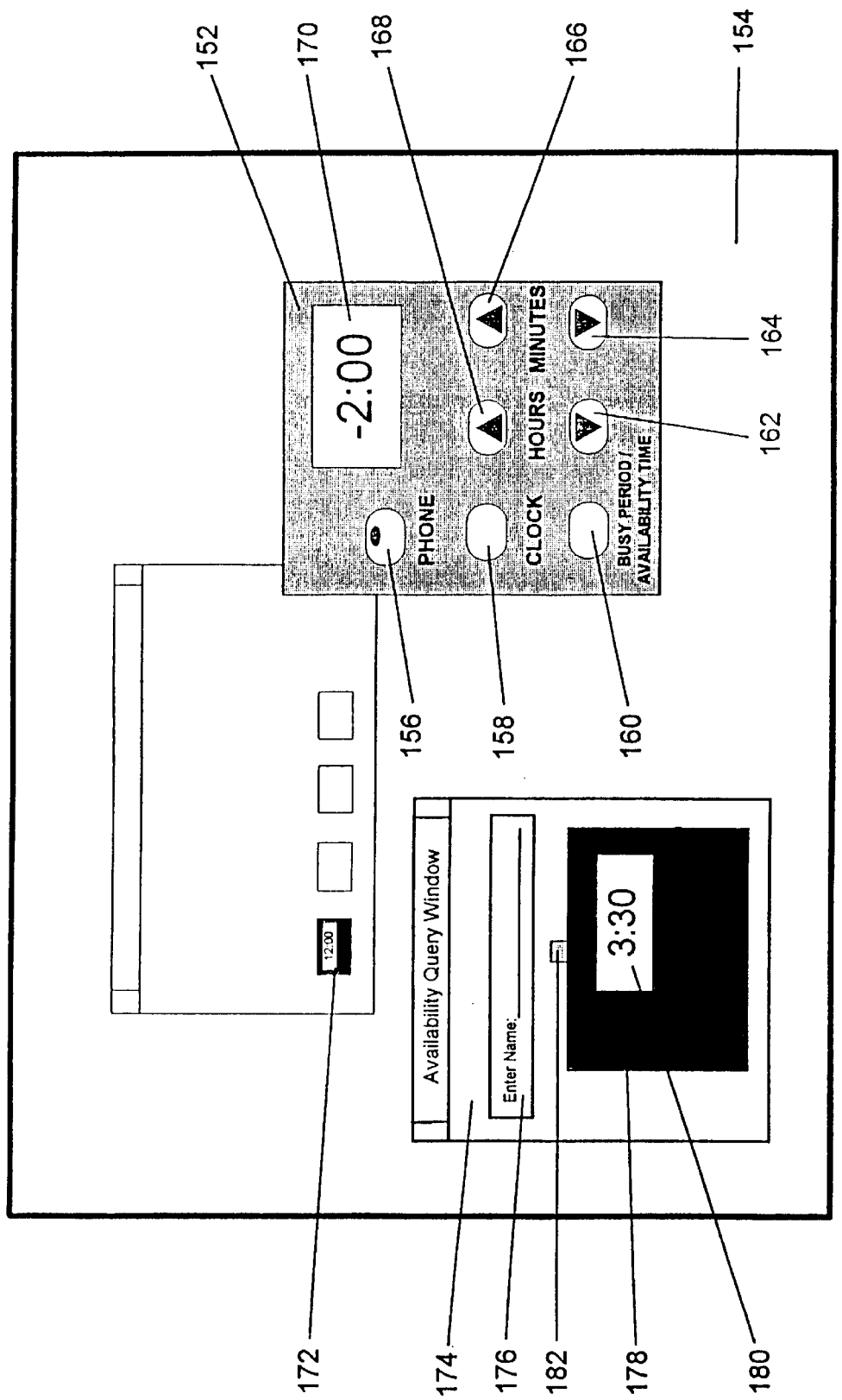
FIG. 8 shows a Graphical User Interface displayed on a desktop computer to permit control of the invention.

In the Computer/Control/Availability Configuration, the operator uses the keys on Control Unit 20 to set the Clock, Busy Period, and Availability Time in the same manner as with Configuration 1. In addition, it is also possible to set the Clock, Busy Period, and Availability Time using the keyboard and mouse of desktop computer 134. FIG. 8 depicts a Control Graphical User Interface (GUI) 152 that is displayed on a computer screen 154 for the purposes of setting the Clock, Busy Period, and Availability Time. Control GUI 152 is based on a graphical window product such as the Windows 3.1 product available from Microsoft Corporation. Control GUI 152 replicates the layout of the display and keys of Control Unit 20 by providing a Phone Key Symbol 156, a Clock Key Symbol 158, a Busy Period/Availability Time Key Symbol 160, an Hours Down Key Symbol 162, a Minutes Down Key Symbol 164, a Minutes Up Key Symbol 166, and an Hours Up Key Symbol 168. A Display Section 170 replicates Control Unit Display 38.

Figure 9:
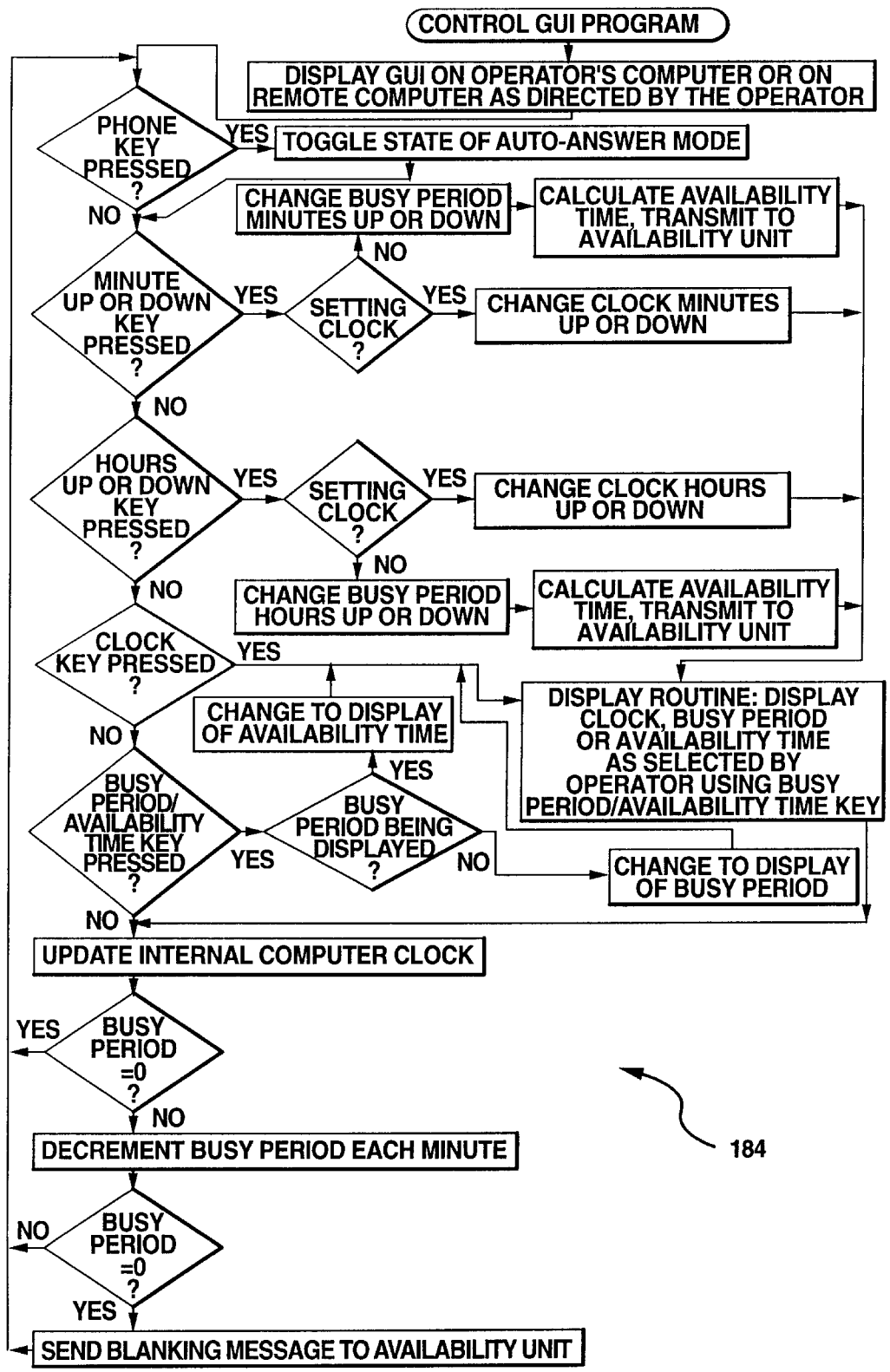
FIG. 9 is a flowchart depicting the program sequences of a Graphical User Interface program.

Control GUI 152 is generated by a Control GUI Program 184 of FIG. 9. Control GUI Program 184 monitors keyboard and mouse actions taken by the operator of desktop computer 134. The operator uses the computer's mouse to "click on" Key Symbols 156, 158, 160, 162, 164, 166 and 168. For example, if the Busy Period is displayed on Display Section 170, clicking on Minutes Up Key Symbol 166 causes two actions: (1) the Busy Period shown on Display Section 170 is incremented by one minute and (2) desktop computer 134 calculates a new Availability Time and transmits the Busy Period and the Availability Time over cable assembly 66 to Control Unit 20. Control Unit 20 then re-transmits the Availability Time to Availability Unit 22 over 6-wire phone cord 74. Similarly, the operator may click on Clock Key Symbol 158 to view the clock time on Display Section 170 and may click on the Busy Period/Availability Time Key Symbol 160 to toggle Display Section 170 between showing the Busy Period and the Availability Time.

In addition to using the mouse to select the desired key symbols on Control GUI 152, the operator may also use the computer's keyboard to directly set the Clock, Busy Period, or Availability Time. This is done by first clicking on Display Section 170 of Control GUI 152 and then using the numeric keys on the keyboard of desktop computer 134 to directly enter the desired information. If the Busy Period has been selected for display in Display Section 170, keyboard entries set a new Busy Period. If the Availability Time has been selected for display in Display Section 170, keyboard entries set a new Availability Time. In either case, the availability information is then transmitted to Control Unit 20. Control Unit 20, in turn, transmits the Availability Time to Availability Unit 22 for display.

There is complete symmetry of operation between Control Unit 20 and Control GUI 152 in that either can be used as the controller of the invention. Furthermore, operations done using Control Unit 20 are reflected in Display Section 170 on Control GUI 152. Likewise, operations that are done using Control GUI 152 on desktop computer 134 are reflected on Control Unit Display 38 and on Availability Unit 22. For example, if the operator programs a Busy Period of one hour using Control GUI 152, the identical Busy Period is displayed on Control Unit Display 38. Furthermore, the resulting Availability Time is transmitted to Availability Unit 22 and displayed on Availability Time Displays 42 and 52. This operational symmetry permits the operator to interchangeably utilize whichever user interface is preferred.

Referring again to FIG. 5, Configuration 3 of Configuration Table 146 consists of desktop computer 134 connected directly to Availability Unit 22 through translation cable 138. This configuration is hereafter referred to as the Computer/Availability Configuration. In the Computer/Availability Configuration, the operator controls operation entirely from desktop computer 134 using Control GUI 152 of FIG. 8 as generated by Control GUI Program 184 of FIG. 9. Whenever the Availability Time changes, desktop computer 134 transmits the new Availability Time to Availability Unit 22 through translation cable 138.

Referring again to FIG. 5, Configuration 4 of Configuration Table 146 consists of desktop computer 134 connected directly to Control Unit 20 through cable assembly 66. This configuration is hereafter referred to as the Computer/Control Configuration. In this configuration, the operator uses either Control Unit 20 or Control GUI 152 to control operation of the invention. Control Unit Program 148 of FIG. 6 controls operation of Control Unit 20 while Control GUI Program 184 of FIG. 9 controls operation of Control GUI 152. Even though Availability Unit 22 is not included in the Computer/Control Configuration, the operator's Availability Time and Availability Status are nonetheless accessible by a potential visitor through a remote access. Remote access allows the potential visitor to use his computer to access the operator's Availability Time and Availability Status maintained by the operator's desktop computer 134.

Referring again to FIG. 5, Configuration 5 of Configuration Table 146 consists of desktop computer 134 operating in a standalone manner. This configuration is hereafter referred to as the Computer Configuration. In the Computer Configuration, the operator uses Control GUI 152 of FIG. 8 as generated by Control GUI Program 184 of FIG. 9 to control operation of the invention. As with the Computer/Control Configuration, the Computer Configuration does not include Availability Unit 22. However, the operator's Availability Time and Availability Status are nonetheless accessible by a potential visitor through a remote access. Remote access allows a potential visitor to use his computer to access the operator's Availability Time and Availability Status maintained by the operator's desktop computer 134.

Figure 10:
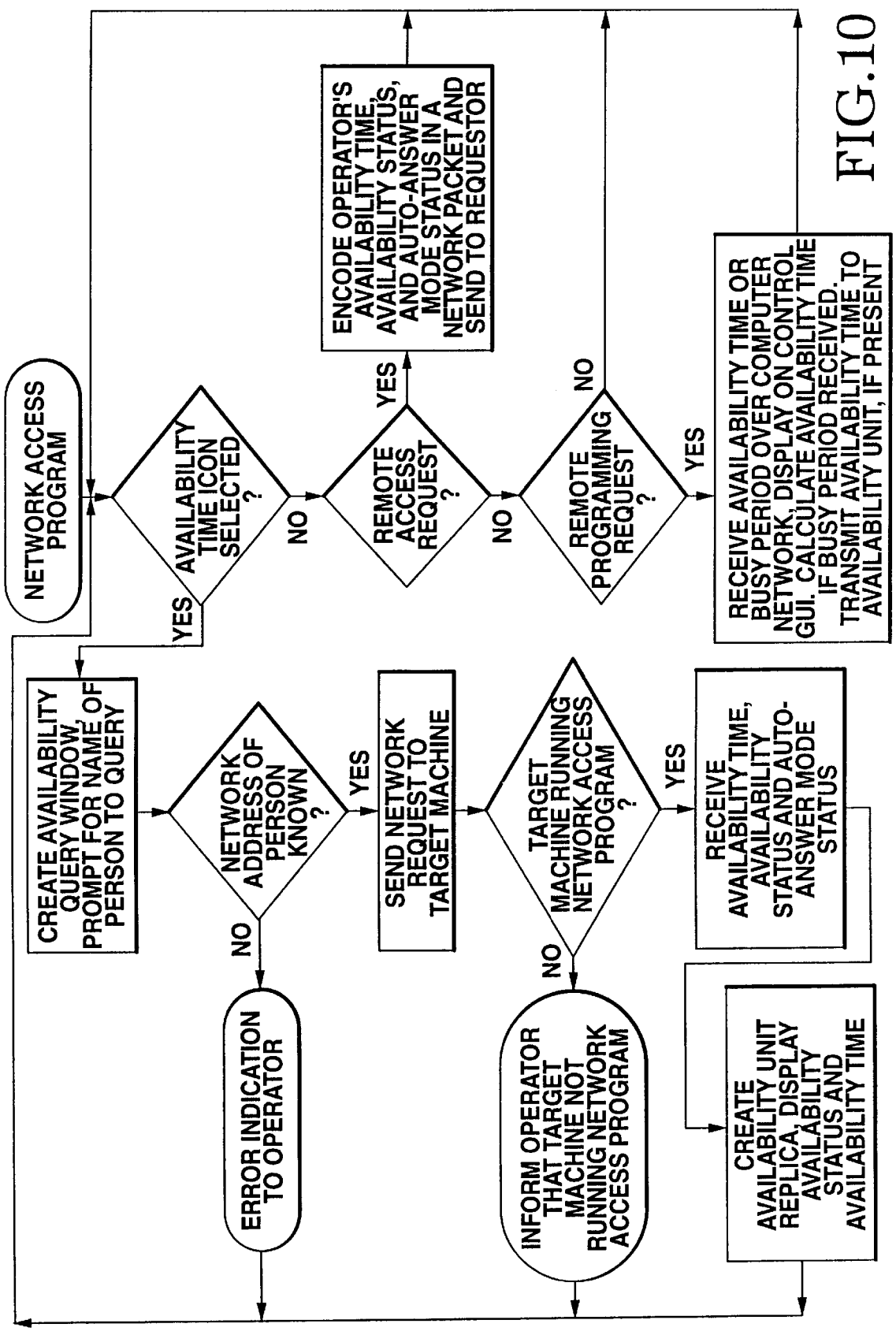
FIG. 10 is a flowchart depicting a network access program of the invention.

FIG. 10 depicts a Network Access Program 186 that executes on desktop computer 134. Network Access Program 186 serves three purposes. First, Network Access Program 186 permits the operator to query the Availability Time and Availability Status maintained on other computers. Second, Network Access Program 186 provides the Availability Time and Availability Status maintained by desktop computer 134 in response to a query received from another computer. Third, Network Access Program 186 supports remote programming of the invention by accepting availability information from another computer over the computer network. Network Access Program 186 must be running on all computers which perform data exchange in support of the invention.

To query the Availability Time of a colleague on another computer, the operator of desktop computer 134 uses the mouse to click on Availability Time Icon 172 on screen 154 of FIG. 8. Availability Time Icon 172 depicts a miniature replica of Availability Unit 22. Network Access Program 186 then creates an Availability Query Window 174 in which the operator is prompted with a dialog box 176 to enter the name of the person whose Availability Time is being requested. Network Access Program 186 presents a selection menu if multiple people have the same name to allow the operator to select the desired person. Using the person's name, Network Access Program 186 performs a table look up to obtain the network address of the person's computer, known as the target computer.

Next, Network Access Program 186 sends a network request to the target computer to request the Availability Time, Availability Status, and Auto-Answer Mode status maintained by the target computer. If the target computer is not also executing Network Access Program 186, an error message is generated in Availability Query Window 174. If Network Access Program 186 is executing on the target computer, the program interprets the request and returns the Availability Time, Availability Status, and Auto-Answer Mode status maintained by the target computer to desktop computer 134 over network connection 136.

Network Access Program 186 on desktop computer 134 then creates an Availability Unit Replica 178 of Availability Unit 22. Availability Unit Replica 178 contains an Availability Time Display Replica 180 which shows the Availability Time of the person being queried. Availability Unit Replica 178 also provides an Availability Status Light Replica 182 which indicates whether the person being queried is currently available. Accessing another person's availability time indicator or availability status indicator through the computer network comprises a remote access of the invention.

Figure 11:
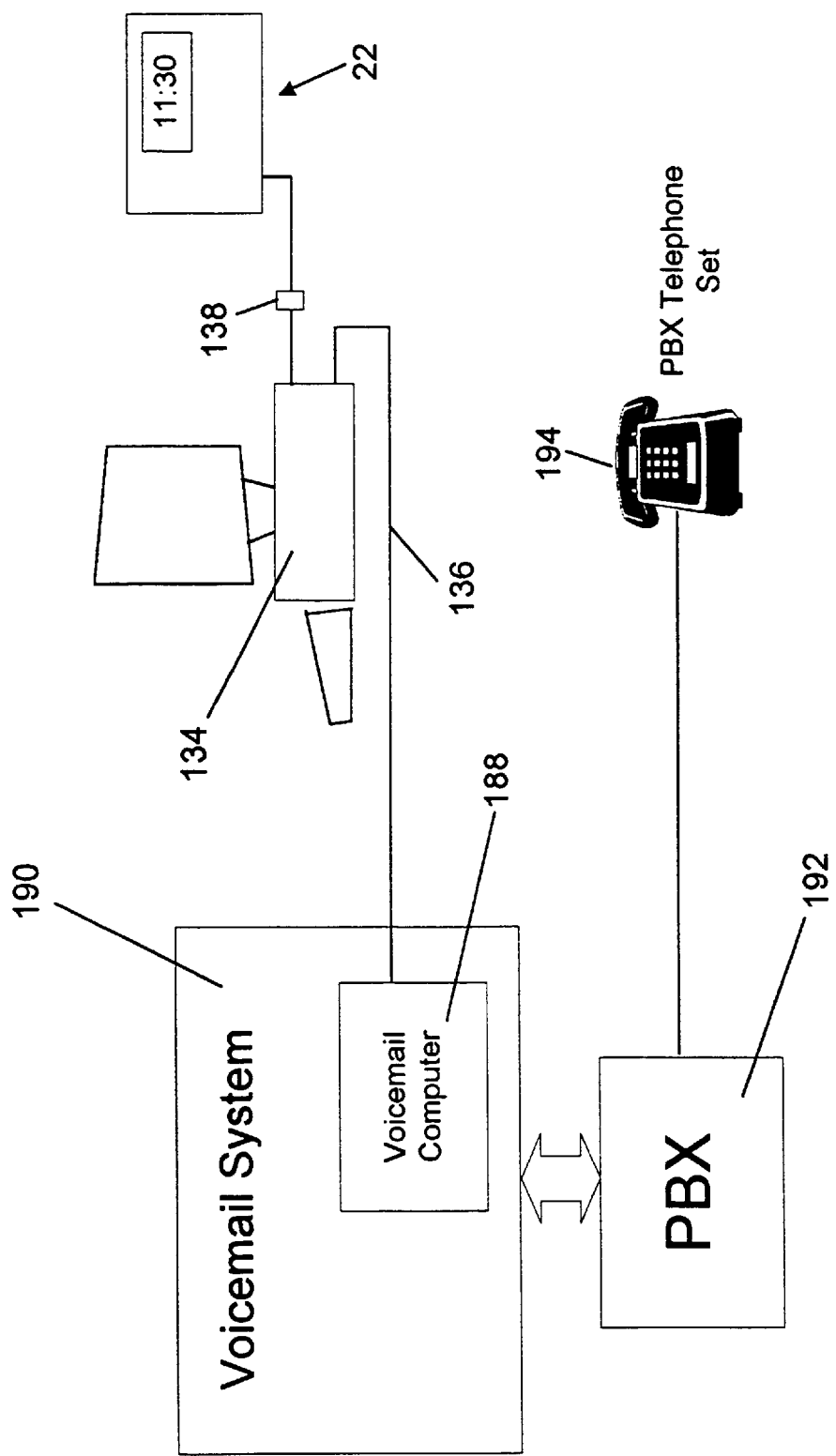
FIG. 11 shows interfacing of the invention to a voicemail system.

Remote access may also be accomplished using the telephony system if a network-capable voicemail system is present. Connection of the invention to the telephony system and voicemail system is shown in FIG. 11. Desktop computer 134 is connected to a voicemail system 190 using network connection 136. Network connection 136 permits data exchange between desktop computer 134 and a voicemail computer 188 contained within voicemail system 190. Voicemail system 190 interfaces to a Private Branch Exchange (PBX) 192 which connects to PBX telephone set 194. Voicemail computer 188 uses network connection 136 to access the Availability Time, Availability Status, and Auto-Answer Mode status maintained by each desktop computer 134 executing Control GUI Program 184 and Network Access Program 186.

Figure 12:
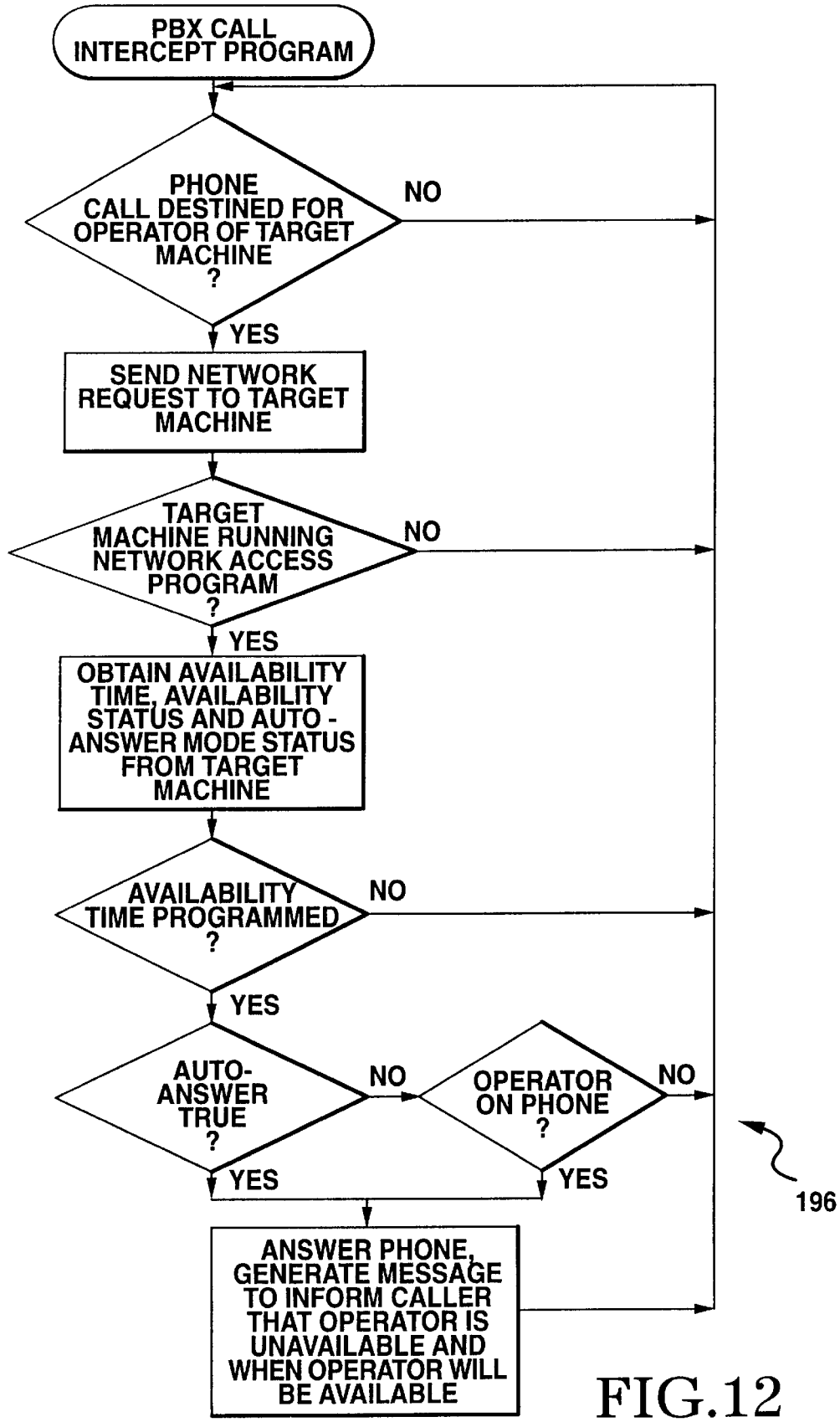
FIG. 12 is a flowchart depicting a voicemail system program used to inform callers of the operator's availability.

Upon receipt of a call to PBX telephone set 194, a PBX Call Intercept Program 196 of FIG. 12 executing on voicemail computer 188 queries desktop computer 134 over network connection 136. Network Access Program 186 of FIG. 10 responds to PBX Call Intercept Program 196 by returning the operator's Availability Time, Availability Status, and Auto-Answer Mode status to voicemail computer 188. If Auto-Answer Mode is active and if an Availability Time has been programmed, voicemail system 190 automatically intercepts the telephone call and provides an audio message conveying the operator's Availability Status and Availability Time such as: "The person you have called is not available, please call back at 11:30". If an Availability Time has been programmed and if PBX telephone set 194 is in use when the call arrives, voicemail system 190 responds automatically with this audio message regardless of the state of Auto-Answer Mode.

Accessing another person's availability status indicator or availability time indicator through the telephony system comprises a remote access of the invention. Thus, remote access may be accomplished using either a computer network or a telephony system.

There are several possible variations to PBX Call Intercept Program 196. Rather than have voicemail computer 188 query the operator's availability information upon receipt of a call, voicemail computer 188 could periodically poll each desktop computer 134 so that the availability information is available prior to arrival of the call. Alternatively, desktop computer 134 could automatically inform voicemail computer 188 whenever there is a change to any of the operator's availability information, such as the Availability Time.

Figure 13:
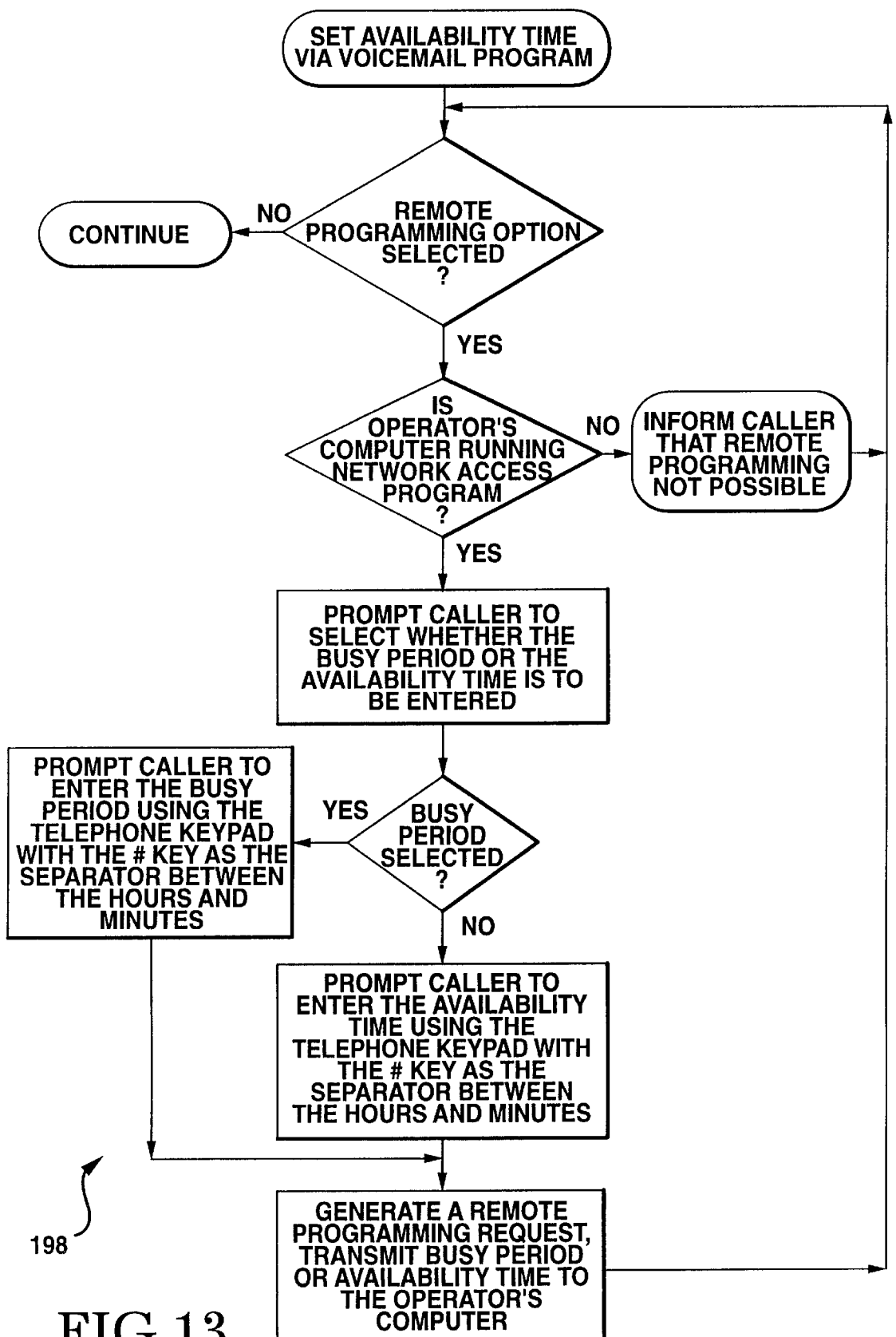
FIG. 13 is a flowchart depicting a voicemail system program which allows the operator to program the Availability Time and Availability Status using a telephone.

The configuration of the invention shown in FIG. 11 also permits the Availability Time and Availability Status to be programmed remotely. For example, if the operator expects to be late in arriving at work, she may desire to program an Availability Time from home to make her expected arrival time at work visible. The operator accomplishes this by calling her voicemail access phone number and then entering her voicemail password to gain access to her voicemail box. Next, she uses the telephone keypad to select execution of a Set Availability Time via Voicemail Program as shown in FIG. 13 at 198. Set Availability Time via Voicemail Program 198 executes on voicemail computer 188 and prompts the caller to enter whether the caller prefers to program the Busy Period or the Availability Time. After specifying whether the Busy Period or Availability Time is to be programmed, the caller enters the desired availability information using the telephone keypad with the pound sign as the delimiter between hours and minutes. Voicemail computer 188 then sends the new Busy Period or Availability Time to desktop computer 134 using network connection 136.

If a Busy Period is received by desktop computer 134, desktop computer 134 calculates the Availability Time by adding the Busy Period to the current time. Subsequently, desktop computer 134 displays the Availability Time on Control GUI 152. If Availability Unit 22 is present, the Availability Time is transmitted to Availability Unit 22 for display on Availability Time Displays 42 and 52. Availability Status Light 46 is turned off.

Remote programming of the Availability Time and Availability Status can also be accomplished when Control Unit 20 is connected to direct connect telephone set 140 in FIG. 5. If Auto-Answer Mode is active and if a Busy Period is also active, Control Unit 20 automatically answers the phone and provides a message as discussed previously. If the operator calls the telephone number of his own direct connect telephone set 140 and if direct connect telephone set 140 is automatically answered as described above, the operator may use the keypad of the phone from which he is calling to program a new Busy Period or new Availability Time in the same manner as Set Availability Time via Voicemail Program 198.

Programming of the availability status indicator or availability time indicator through a telephony system comprises a remote programming of the invention.

Remote programming of the Availability Time can also be accomplished from another computer over the computer network. For example, assume that the operator programs his Availability Time and Availability Status prior to traveling to another building to meet with a colleague. Assume furthermore that the meeting is running late and the operator desires to re-program his Availability Time to a later time. The operator can do this by using another networked computer, such as the colleague's computer, as the controller of the invention. The operator uses the colleague's computer to remotely log into the operator's desktop computer 134 using network connection 136. The operator then executes Control GUI Program 184 and re-directs display of Control GUJI 152 to the colleague's computer. This re-direction causes Control GUI 152 to be displayed on the colleague's computer and allows the mouse and keyboard of the colleague's computer to be used to program the Availability Time in a manner identical to programming it on his own desktop computer 134. When the operator is done, he terminates the remote connection to his desktop computer 134 which causes Control GUI 152 to be removed from the colleague's computer screen.

Programming of the availability time indicator or availability status indicator through a computer network comprises a remote programming of the invention. Thus, remote programming of the invention may be accomplished using either a computer network or a telephony system.

Other variants of the preferred embodiment of the invention are possible without deviating from the scope of this invention.

Communications methods other than an interface cable may be used to communicate between desktop computer 134 and Control Unit 20 and between Control Unit 20 and Availability Unit 22, such as ultrasound communications, infrared communications, radio frequency communications, and the like. Control Unit 20 may be designed to incorporate a network connection 136 so that desktop computer 134 is not required for access of the invention to the computer network.

Mounting systems other than a camera-style system are possible. For example, picture frame mounting hardware could be used to permit Availability Unit 22 to be mounted on a wall or door.

The maximum Busy Period could be increased to a longer period such as 23 hours, 59 minutes from the current 9 hours, 59 minutes. To reduce costs, Availability Time Display 52 on back panel 50 of Availability Unit 22 could be eliminated.

What is claimed is:

1. A timing system for indicating the present availability of an operator of the timing system to a potential visitor who desires to ascertain the present availability of the operator, the operator of the system having an office area which defines an area of personal workspace for the operator, the timing system comprising:

(a) an availability time indicator for indicating to the potential visitor via a visual display a time when the operator will become available to interact with the potential visitor so as to reduce interruptions of the operator, wherein the availability time indicator is adapted for locating immediately proximate to the office area of the operator so as to be viewable by the potential visitor when the potential visitor is located in proximity to the office area of the operator, (b) an availability status indicator for indicating to the potential visitor via a light indicator whether the operator is currently available to interact with the potential visitor, so as to reduce interruptions of the operator, wherein the availability status indicator is adapted for locating immediately proximate to the office area of the operator so as to be viewable by the potential visitor when the visitor is located in proximity to the office area of the operator;

(c) a controller for use by the operator of the system to input time information, wherein the controller controls the availability status indicator and the availability time indicator;

(d) a time calculator to calculate approximately when the operator will become available based on the time information input by the operator of the system; and (e) circuitry which switches said availability status indicator between a continuing unlighted state and a continuing lighted state in response to said time calculator.

2. The timing system as recited in claim 1 wherein said timing system comprises at least one communications link from said controller to said availability time indicator and to said availability status indicator.

3. A timing system for indicating the present availability of an operator of the timing system to a potential visitor who desires to ascertain the present availability of the operator, the operator of the timing system having an office area which defines an area of personal workspace for the operator, the system comprising:

(a) an availability time indicator to indicate to the potential visitor via a visual display a time of day when the operator will become available to interact with the potential visitor so as to reduce interruptions of the operator, wherein the availability time indicator is adapted for locating immediately proximate to the office area of the operator so as to be viewable by the potential visitor when the potential visitor is located in proximity to the office area of the operator; and (b) a controller associated with the availability time indicator to be used by the operator of the system to input a busy period, wherein the controller controls the availability time indicator and wherein the controller is adapted for locating separately from the availability time indicator so as to facilitate the input of the busy period and to facilitate the indicating to the potential visitor via the visual display the time of day when the operator will become available, wherein the controller comprises:
- (b1) an entering device to enter the busy period;
- (b2) a memory to store the busy period;
- (b3) a clock to determine a present time of day when the operator inputs the busy period; and
- (b4) a time calculator to calculate approximately the time of day when the operator will become available for display on the availability time indicator, wherein the time of day when the operator will become available is based on the present time of day and the busy period; and (c) at least one communications link from the controller to the availability time indicator to communicate the time of day when the operator will become available to the availability time indicator.

4. The timing system as recited in claim 3 and further comprising a blanking circuit which blanks at least the time of day when the operator will become available displayed on the availability time indicator to indicate that the operator is available.

5. The timing system as recited in claim 3 and further comprising a visual display of the controller and a flashing circuit, wherein the flashing circuit causes at least a portion of the visual display of the controller to flash to indicate conclusion of the busy period.

6. The timing system as recited in claim 3 and further comprising a visual display of the controller adapted to display at least the busy period.

7. The timing system as recited in claim 6 and further comprising a decrementing circuit to decrement the busy period displayed on the visual display of the controller.

8. A timing system for indicating the present availability of an operator of the timing system to a potential visitor who desires to ascertain the present availability of the operator, the operator of the timing system having an office area which defines an area of personal workspace for the operator, the system comprising:

(a) an availability time indicator to indicate to the potential visitor via a visual display a time of day when the operator will become available to interact with the potential visitor so as to reduce interruptions of the operator, wherein the availability time indicator is adapted for locating immediately proximate to the office area of the operator so as to be viewable by the potential visitor when the potential visitor is located in proximity to the office area of the operator; and (b) a controller associated with the availability time indicator to be used by the operator of the system to input the time of day when the operator of the system will become available, wherein the controller controls the availability time indicator and wherein the controller is adapted for locating separately from the availability time indicator so as to facilitate the input of the time of day when the operator will become available and to facilitate the indicating to the potential visitor via the visual display the time of day when the operator will become available, wherein the controller comprises:
- (b1) an entering device to enter the time of day when the operator will become available; and
- (b2) a memory to store the time of day when the operator will become available;

(c) at least one communications link from the controller to the availability time indicator to communicate the time of day to the availability time indicator; and (d) a blanking circuit which blanks the time of day displayed on the availability time indicator.

9. The timing system as recited in claim 8 and further comprising a visual display of the controller and a flashing circuit, wherein the flashing circuit causes at least a portion of the visual display of the controller to flash to indicate arrival of the time of day when the operator will become available.

10. The timing system as recited in claim 3 or 8 wherein said availability time indicator comprises at least one alphanumeric character.

11. The timing system as recited in claim 3 or 8 wherein said availability time indicator comprises at least one numerical display.

12. The timing system as recited in claim 3 or 8 wherein said availability time indicator comprises a unitary display unit having a plurality of sides and a plurality of visual displays and wherein each visual display is mounted on a different side of the unitary display unit so as to facilitate viewing of at least one of the displays by said potential visitor.

13. The timing system as recited in claim 3 or 8 wherein the timing system is adapted for electrical connection to remote programming circuitry for use by the operator in order to input from a remote location the time when the operator will become available to interact with the potential visitor.

14. The timing system as recited in claim 13 wherein said remote programming circuitry comprises a computer network.

15. The timing system as recited in claim 13 wherein said remote programming circuitry comprises a telephony system.

16. The timing system for indicating the present availability of an operator of the timing system to a potential visitor who desires to ascertain the present availability of the operator, the operator of the timing system having an office area which defines an area of personal workstation for the operator, the system comprising:

(a) an availability time indicator to indicate to the potential visitor via a visual display a time of day when the operator will become available to interact with the potential visitor so as to reduce interruptions of the operator, wherein the availability time indicator is adapted for locating immediately proximate to the office area of the operator so as to be viewable by the potential visitor when the potential visitor is located in proximity to the office area of the operator; and (b) a controller to be used by the operator of the system to input time information, wherein the controller controls the availability time indicator, the controller comprising:
- (b1) an entering device to enter the time information; and
- (b2) a memory to store the time information;

(c) a time calculator to calculate approximately when the operator will become available based on the time information; and (d) circuitry which changes at least a portion of the visual display in response to said time calculator.

17. The timing system as described in claim 16 and further comprising a plurality of visual displays.

18. The timing system as described in claim 16 wherein the control is adapted for locating separately from the availability time indicator.

19. The timing system for indicating the present availability of an operator of the timing system to a potential visitor of the operator who desires to ascertain the present availability of the operator, the operator of the timing system having an office area which defines an area of personal workspace for the operator, the system comprising:
   (a) an availability status indicator for indicating to the potential visitor via a light indicator whether the operator is currently available to interact with the potential visitor so as to reduce interruptions of the operator, wherein the availability status indicator is adapted for locating immediately proximate to the office area of the operator so as to be viewable by the potential visitor when the potential visitor is located in proximity to the office area of the operator; and
   (b) a controller associated with the availability status indicator to be used by the operator of the timing system to input time information, the controller comprising:
      (i) circuitry which maintains the availability status indicator in a continuing lighted state;
      (ii) circuitry which maintains the availability status indicator in a continuing unlighted state;
      (iii) an entering device to enter the time information;
      (iv) a memory to store the time information;
      (v) a time calculator to calculate approximately when the operator will become available based on the time information; and
      (vi) circuitry which switches said availability status indicator between said continuing unlighted state and, said continuing lighted state in response to said time calculator.

20. The timing system as described in claim 19 wherein the controller is adapted for locating separately from the availability status indicator.

21. The timing system as described in claim 16 or 19 wherein the timing system is adapted for electrical connection to remote programming circuitry for use by the operator in order to input the time information from a remote location.

22. The timing system as described in claim 21 wherein the remote programming circuitry comprises a computer network.

23. The timing system as described in claim 21 wherein the remote programming circuitry comprises a telephony system.

24. The timing system as described in claim 16 or 19 wherein the timing system is adapted for electrical connection to remote access circuitry.

25. The timing system as described in claim 24 wherein the remote access circuitry comprises a computer network.

26. The timing system as described in claim 24 wherein the remote access circuitry comprises a telephony system.

27. A method of indicating to a potential visitor of an operator of a timing system the present availability of the operator of the timing system, the operator of the timing system having an office area which defines an area of personal workspace for the operator, the method comprising:
   (a) locating a visual display of an availability time indicator immediately proximate to the office area of the operator so as to indicate the present availability of the operator to the potential visitor when the potential visitor is located in visual proximity to the office area of the operator so as to be able to view the visual display;
   (b) permitting the operator to input into a controller of the availability time indicator a busy period representing a period of time after which the operator of the system will become available to be visited by the potential visitor;
   (c) storing the busy period in a memory for use by the controller of the availability time indicator;
   (d) determining an approximate time of day when the operator input the busy period;
   (e) determining an availability time representing a time at which the operator will become available to be visited by the potential visitor based on the busy period input by the operator and the approximate time of day when the operator input the busy period;
   (f) communicating the availability time to the availability time indicator; and
   (g) displaying the availability time via the availability time indicator to visually indicate to the potential visitor who desires to ascertain the availability of the operator the present availability of the operator.

28. The method as recited in claim 27 and further comprising indicating conclusion of the busy period.

29. The method as recited in claim 27 and further comprising blanking at least a portion of the visual display to indicate expiration of the busy period.

30. The method as recited in claim 29 wherein a portion of the visual display displays the availability time and further comprising blanking only the portion of the visual display which displays the availability time.

31. The method as recited in claim 27 wherein the controller comprises a visual display and further comprising flashing at least a portion of the visual display of the controller to indicate conclusion of the busy period.

32. The method as recited in claim 27 and further comprising displaying the busy period on a visual display of the controller.

33. The method as recited in claim 32 and further comprising decrementing the busy period displayed on the visual display of the controller.

34. The method as recited in claim 37, wherein said determining an availability time representing a time at which the operator will become availability comprises adding the busy period to the approximate time of day.

35. A method of indicating to a potential visitor of an operator of a timing system the present availability of the operator of the timing system, the operator of the timing system having an office area which defines an area of personal workspace for the operator, the method comprising:
   (a) locating a visual display of an availability time indicator immediately proximate to the office area of the operator so as to indicate the present availability of the operator to the potential visitor when the potential visitor is located in visual proximity to the office area of the operator so as to be able to view the visual display;
   (b) permitting the operator to input time information into a controller of the availability time indicator;
   (c) storing the inputted time information in a memory for use by the controller of the availability time indicator;
   (d) calculating approximately when the operator will become available based on the time information; and
   (e) changing at least a portion of the visual display in response to said time calculator.

36. The method as recited in claim 35 wherein the changing at least a portion of the visual display indicates the arrival of an availability time.

37. The method as recited in claim 35 and further comprising utilizing a plurality of visual displays.

38. The method as recited in claim 35 wherein the controller comprises a visual display of the controller and further comprising flashing at least a portion of the visual display of the controller to indicate arrival of an availability time.

39. The method as recited in claim 35 and wherein the controller comprises a visual display of the controller and further comprising displaying an availability time on the visual display of the controller.

40. The method as recited in claim 27 or 35 and further comprising utilizing at least one alphanumeric character to display information on the availability time indicator.

41. A method of indicating to a potential visitor of an operator of a timing system the present availability of the operator of the timing system, the operator of the timing system having an office area which defines an area of personal workspace for the operator, the method comprising:

(a) locating an availability status indicator immediately proximate to the office area of the operator so as to indicate the present availability of the operator to the potential visitor when the potential visitor is located in visual proximity to the office area of the operator so as to be able to view the availability status indicator;

(b) permitting the operator to input time information into a controller of the availability status indicator;

(c) storing the inputted time information in a memory for use by the controller of the availability time indicator;

(d) calculating approximately when the operator will become available based on the time information; and (e) changing the availability status indicator from a lighted state to an unlighted state in response to said calculating approximately when the operator will become available.

42. The method as recited in claim 27, 35 or 41 and further comprising remotely programming said indicator by said operator via said controller when said operator is located in a remote location.

43. The method as recited in claim 42 wherein said remotely programming said indicator from a remote location further comprises programming over a computer network.

44. The method as recited in claim 42 wherein said remotely programming said availability time indicator from a remote location further comprises programming through a telephony system.

45. The method as described in claim 35 or 41 and further comprising accessing the timing system by a user from a remote location.

46. The method as described in claim 45 and further comprising accessing the timing system via a computer network.

47. The method as described in claim 46 and further comprising accessing the timing system via a telephony system.

* * * * *